US008731693B2

(12) United States Patent
Takano et al.

(10) Patent No.: US 8,731,693 B2
(45) Date of Patent: May 20, 2014

(54) VOICE INPUT DEVICE, METHOD OF PRODUCING THE SAME, AND INFORMATION PROCESSING SYSTEM

(75) Inventors: Rikuo Takano, Tsukuba (JP); Kiyoshi Sugiyama, Mitaka (JP); Toshimi Fukuoka, Yokohama (JP); Masatoshi Ono, Tsukuba (JP); Ryusuke Horibe, Daito (JP); Shigeo Maeda, Daito (JP); Fuminori Tanaka, Daito (JP); Takeshi Inoda, Daito (JP); Hideki Choji, Daito (JP)

(73) Assignees: Funai Electric Advanced Applied Technology Research Institute Inc., Daito-shi (JP); Funai Electric Co., Ltd., Daito-shi (JP)

(*) Notice: Subject to any disclaimer, the term of this patent is extended or adjusted under 35 U.S.C. 154(b) by 1396 days.

(21) Appl. No.: 12/516,004

(22) PCT Filed: Nov. 21, 2007

(86) PCT No.: PCT/JP2007/072591

§ 371 (c)(1),
(2), (4) Date: Jun. 21, 2010

(87) PCT Pub. No.: WO2008/062848

PCT Pub. Date: May 29, 2008

(65) Prior Publication Data

US 2010/0280825 A1 Nov. 4, 2010

(30) Foreign Application Priority Data

Nov. 22, 2006 (JP) ................................ 2006-315882
Nov. 19, 2007 (JP) ................................ 2007-299725

(51) Int. Cl.
*H04B 15/00* (2006.01)
*G06F 17/00* (2006.01)

(52) U.S. Cl.
USPC ........................................... 700/94; 381/94.1

(58) Field of Classification Search
USPC ........ 381/7, 10, 22, 16, 92, 94.1–94.9, 71.11, 381/71.1, 120; 342/357, 378–380, 16, 6; 455/306; 701/213; 700/94
See application file for complete search history.

(56) References Cited

U.S. PATENT DOCUMENTS 5,029,215 A * 7/1991 Miller, II ........................ 381/58
5,214,709 A 5/1993 Ribic (Continued)

FOREIGN PATENT DOCUMENTS

EP 0 466 676 A2 1/1992
JP 5-216495 A 8/1993

(Continued)

OTHER PUBLICATIONS

International Search Report dated Feb. 5, 2008 (Two (2) pages).

(Continued)

*Primary Examiner* — Fan Tsang
*Assistant Examiner* — Eugene Zhao
(74) *Attorney, Agent, or Firm* — Crowell & Moring LLP

(57) ABSTRACT

A voice input device includes a first microphone (710-1) that includes a first diaphragm, a second microphone (710-2) that includes a second diaphragm, and a differential signal generation section (720) that generates a differential signal that indicates a difference between a first voltage signal and a second voltage signal, the first diaphragm and the second diaphragm being disposed so that a noise intensity ratio is smaller than an input voice intensity ratio (input voice component intensity ratio), and the differential signal generation section (720) including a gain section (760) that amplifies the first voltage signal by a predetermined gain, and a differential signal output section (740) that generates and outputs a differential signal that indicates a difference between the first voltage signal amplified by the gain section and the second voltage signal.

27 Claims, 30 Drawing Sheets

(56) References Cited

U.S. PATENT DOCUMENTS

| | | | | |
|---|---|---|---|---|
| 5,546,458 | A | 8/1996 | Iwami | |
| 6,081,603 | A | 6/2000 | Engh et al. | |
| 7,146,013 | B1 | 12/2006 | Saito et al. | |
| 7,577,262 | B2 | 8/2009 | Kanamori et al. | |
| 7,864,969 | B1 * | 1/2011 | Ma et al. | 381/92 |
| 8,098,844 | B2 * | 1/2012 | Elko | 381/94.1 |
| 2002/0149070 | A1 * | 10/2002 | Sheplak et al. | 257/415 |
| 2006/0222184 | A1 | 10/2006 | Buck et al. | |
| 2007/0253570 | A1 | 11/2007 | Fukumoto et al. | |
| 2008/0260175 | A1 * | 10/2008 | Elko | 381/73.1 |

FOREIGN PATENT DOCUMENTS

| | | | |
|---|---|---|---|
| JP | 6-269083 | A | 9/1994 |
| JP | 7-312638 | A | 11/1995 |
| JP | 9-331377 | A | 12/1997 |
| JP | 11-18186 | A | 1/1999 |
| JP | 2893756 | B2 | 5/1999 |
| JP | 11-163650 | A | 6/1999 |
| JP | 11-298988 | A | 10/1999 |
| JP | 2000-312395 | A | 11/2000 |
| JP | 2001-186241 | A | 7/2001 |
| JP | 2001-309483 | A | 11/2001 |
| JP | 2002-84590 | A | 3/2002 |
| JP | 2003-32779 | A | 1/2003 |
| JP | 2003-333683 | A | 11/2003 |
| JP | 2004-128856 | A | 4/2004 |
| JP | 2004-129038 | A | 4/2004 |
| JP | 2004-173053 | A | 6/2004 |
| JP | 2004-187283 | A | 7/2004 |
| JP | 2004-214784 | A | 7/2004 |
| JP | 2005-203944 | A | 7/2005 |
| JP | 2005-217749 | A | 8/2005 |
| JP | 2006-94522 | A | 4/2006 |
| JP | 2006-174136 | A | 6/2006 |
| JP | 2006-222769 | A | 8/2006 |
| WO | WO 01/37519 | A2 | 5/2001 |
| WO | WO 2006/062120 | A1 | 6/2006 |

OTHER PUBLICATIONS

Notification of Reasons for Refusal dated Oct. 12, 2011 including English-language translation (Twelve (12) pages).

U.S. Appl. No. 12/516,018, entitled "Integrated Circuit Device, Voice Input Device and Information Processing System", filed May 22, 2009.

U.S. Appl. No. 12/516,010, entitled "Voice Input Device, Method of Producing the Same and Information Processing System", filed May 22, 2009.

The Extended European Search Report dated Aug. 29, 2011 (Eight (8) pages).

The Extended European Search Report dated Aug. 29, 2011 (Seven (7) pages).

* cited by examiner

VOICE INPUT DEVICE, METHOD OF PRODUCING THE SAME, AND INFORMATION PROCESSING SYSTEM

CROSS-REFERENCE TO RELATED APPLICATIONS

This application contains subject matter related to U.S. application Ser. No. 12/516,018, entitled "Integrated Circuit Device, Voice Input Device and Information Processing System," filed May 22, 2009 and U.S. application Ser. No. 12/516,010, entitled "Voice Input Device, Method of Producing the Same and Information Processing System, filed May 22, 2009.

TECHNICAL FIELD

The present invention relates to a voice input device, a method of producing the same, and an information processing system.

BACKGROUND ART

It is desirable to pick up only desired sound (user's voice) during a telephone call, voice recognition, voice recording, or the like. However, sound (e.g., background noise) other than the desired sound may also be present in a usage environment of a voice input device. Therefore, a voice input device having a noise removal function has been developed.

As technology that removes noise in a usage environment in which noise is present, a method that provides a microphone with sharp directivity, and a method that detects the travel direction of sound waves utilizing the difference in sound wave arrival time and removes noise by signal processing have been known.

In recent years, since electronic instruments have been increasingly scaled down, technology that reduces the size of a voice input device has become important. JP-A-7-312638, JP-A-9-331377, and JP-A-2001-186241 disclose related-art technologies.

DISCLOSURE OF THE INVENTION

In order to provide a microphone with sharp directivity, it is necessary to arrange many diaphragms. This makes it difficult to reduce the size of a voice input device.

In order to detect the travel direction of sound waves utilizing the difference in sound wave arrival time, a plurality of diaphragms must be provided at intervals equal to a fraction of several wavelengths of an audible sound wave. This also makes it difficult to reduce the size of a voice input device.

When utilizing a differential signal that indicates the difference between sound waves obtained by a plurality of microphones, a variation in delay or gain that occurs during the microphone production process may affect the noise removal accuracy.

Several aspects of the invention may provide a voice input device having a function of removing a noise component, a method of producing the same, and an information processing system.

(1) According to the invention, there is provided a voice input device comprising:

a first microphone that includes a first diaphragm;

a second microphone that includes a second diaphragm; and a differential signal generation section that generates a differential signal that indicates a difference between a first voltage signal obtained by the first microphone and a second voltage signal obtained by the second microphone based on the first voltage signal and the second voltage signal, the first diaphragm and the second diaphragm being disposed so that a noise intensity ratio that indicates a ratio of intensity of a noise component contained in the differential signal to intensity of the noise component contained in the first voltage signal or the second voltage signal is smaller than an input voice intensity ratio that indicates a ratio of intensity of an input voice component contained in the differential signal to intensity of the input voice component contained in the first voltage signal or the second voltage signal; and the differential signal generation section including:

a gain section that amplifies the first voltage signal obtained by the first microphone by a predetermined gain; and a differential signal output section that receives the first voltage signal amplified by the gain section and the second voltage signal obtained by the second microphone, generates a differential signal that indicates a difference between the first voltage signal amplified by the gain section and the second voltage signal, and outputs the differential signal.

The gain section amplifies the input signal by a predetermined gain. The gain section may be formed by an analog amplifier circuit when processing an analog signal, and may be formed by a digital multiplier or the like when processing a digital signal.

The sensitivity (gain) of the microphone may vary due to an electrical or mechanical factor during the production process. Therefore, the amplitudes of the voltage signals output from the first microphone and the second microphone (the gains of the microphones) may vary (normally in the range of about ±3 dB). It was experimentally confirmed that such a variation may reduce the distant noise reduction effect of a differential microphone.

According to the invention, a variation in amplitude of the first voltage signal and the second voltage signal (variation in gain) can be corrected by amplifying (increasing or decreasing) the first voltage signal by a predetermined gain. A variation in amplitude of the first voltage signal and the second voltage signal may be corrected so that the amplitude of the first voltage signal is equal to the amplitude of the second voltage signal with respect to the input sound pressure, or the difference in amplitude between the first voltage signal and the second voltage signal is within a predetermined range. Therefore, a decrease in noise reduction effect due to a variation in sensitivity of each microphone that has occurred during the production process can be prevented.

According to this voice input device, the first microphone and the second microphone (first diaphragm and second diaphragm) are disposed to satisfy a predetermined condition. Therefore, the differential signal that indicates the difference between the first voltage signal and the second voltage signal obtained by the first microphone and the second microphone can be considered to be a signal that indicates the input voice from which a noise component has been removed. Accordingly, the invention can provide a voice input device that can implement a noise removal function by a simple configuration that merely generates the differential signal.

The differential signal generation section of the voice input device generates the differential signal without performing an analysis process (e.g., Fourier analysis) on the first voltage signal and the second voltage signal. Therefore, the signal processing load of the differential signal generation section can be reduced, or the differential signal generation section can be implemented by a very simple circuit.

Accordingly, the invention can provide a voice input device that can be reduced in size and can implement a highly accurate noise removal function.

In the voice input device, the first diaphragm and the second diaphragm may be disposed so that the intensity ratio based on the phase difference component of the noise component is smaller than the intensity ratio based on the amplitude of the input voice component.

(2) In the voice input device according to the invention, the differential signal generation section may include:

the gain section that is configured so that an amplification factor is changed corresponding to a voltage applied to a predetermined terminal or a current that flows through the predetermined terminal; and a gain control section that controls the voltage applied to the predetermined terminal or the current that flows through the predetermined terminal, the gain control section including a resistor array in which a plurality of resistors are connected in series or parallel, or including at least one resistor, and configured so that the voltage applied to the predetermined terminal or the current that flows through the predetermined terminal can be changed by cutting some of the plurality of resistors or conductors that form the resistor array or cutting part of the at least one resistor.

The resistance of the resistor array may be changed by cutting the resistors or conductors that form the resistor array using a laser or fusing the resistors or conductors by applying a high voltage or a high current, or the resistance of the resistor may be changed by cutting part of one resistor.

A variation in gain that occurs during the microphone production process is determined, and the amplification factor of the first voltage signal is determined to cancel the difference in amplitude caused by the variation. The resistance of the gain control section is set at an appropriate value by cutting some of the resistors or conductors (e.g., fuses) that form the resistor array so that a voltage or a current that implements the determined amplification factor can be supplied to the predetermined terminal. This makes it possible to adjust the balance between the amplitude of the output from the gain section and the amplitude of the second voltage signal obtained by the second microphone.

(3) In the voice input device according to the invention, the differential signal generation section may include:

an amplitude difference detection section that receives the first voltage signal and the second voltage signal input to the differential signal output section, detects a difference in amplitude between the first voltage signal and the second voltage signal when the differential signal is generated based on the first voltage signal and the second voltage signal that have been received, generates an amplitude difference signal based on the detection result, and outputs the amplitude difference signal; and a gain control section that changes an amplification factor of the gain section based on the amplitude difference signal.

The amplitude difference detection section may include a first amplitude detection section that detects the amplitude of the signal output from the gain section, a second amplitude detection section that detects the amplitude of the second voltage signal obtained by the second microphone, and an amplitude difference signal generation section that detects the difference between the amplitude signal detected by the first amplitude detection means and the amplitude signal detected by the second amplitude detection means.

For example, a gain adjustment test sound source may be provided, and may be set so that sound output from the sound source is input to the first microphone and the second microphone at an equal sound pressure. The first microphone and the second microphone may receive the sound, and the waveforms of the first voltage signal and the second voltage signal may be monitored using an oscilloscope or the like. The amplification factor may be changed so that the amplitude of the first voltage signal coincides with the amplitude of the second voltage signal (or the difference in amplitude is within a predetermined range).

(4) In the voice input device according to the invention, the gain control section may control the amplification factor of the gain section so that a difference in amplitude between a signal output from the gain section and the second voltage signal obtained by the second microphone is within a predetermined range with respect to the signal output from the gain section or the second voltage signal obtained by the second microphone, or a predetermined level of noise reduction is achieved.

For example, the amplification factor of the gain section may be adjusted so that the difference in amplitude between the signals is within a range from −3% to +3% or a range from −6% to +6% with respect to the second voltage signal. When the difference in amplitude is within a range from −3% to +3% with respect to the second voltage signal, noise can be reduced by about 10 dB. When the difference in amplitude is within a range from −6% to +6% with respect to the second voltage signal, noise can be reduced by about 6 dB.

The amplification factor of the gain section may be adjusted so that a predetermined noise reduction effect (e.g., by about 10 dB) is achieved.

(5) The voice input device may further comprise:

a sound source section that is provided at an equal distance from the first microphone and the second microphone, wherein the differential signal generation section changes the amplification factor of the gain section based on sound output from the sound source section.

The differential signal generation section may adjust the amplification factor of the gain section so that the amplitude of the signal output from the gain section is equal to the amplitude of the second voltage signal obtained by the second microphone based on sound output from the sound source section and received by the first microphone and the second microphone.

(6) According to the invention, there is provided a voice input device comprising:

a first microphone that includes a first diaphragm;

a second microphone that includes a second diaphragm;

a differential signal generation section that generates a differential signal that indicates a difference between a first voltage signal obtained by the first microphone and a second voltage signal obtained by the second microphone based on the first voltage signal and the second voltage signal; and a sound source section that is provided at an equal distance from the first microphone and the second microphone, the differential signal generation section including:

a gain section that amplifies the first voltage signal obtained by the first microphone by a predetermined gain;

an amplitude difference detection section that receives the first voltage signal and the second voltage signal input to a differential signal output section, detects a difference in amplitude between the first voltage signal and the second voltage signal when the differential signal is generated based on the first voltage signal and the second voltage signal that have been received, generates an amplitude difference signal based on the detection result, and outputs the amplitude difference signal; and a gain control section that changes an amplification factor of the gain section based on the amplitude difference signal; and the amplification factor of the gain section being adjusted based on sound output from the sound source section so that an amplitude of the first voltage signal is equal to an amplitude of the second voltage signal.

According to the invention, a variation in gain of the microphone that changes due to the usage state (usage environment or duration) can be adjusted.

(7) In the voice input device according to the invention, the sound source section may be a sound source that produces sound having a single frequency.

(8) In the voice input device according to the invention, a frequency of the sound source section may be set outside an audible band.

When the frequency of the sound source section is set outside the audible band, the difference in phase or delay between the input signals can be adjusted using the sound source section during use without hindering the user. According to the invention, since the gain can be dynamically adjusted during use, the gain can be adjusted corresponding to the environment (e.g., a change in temperature).

(9) In the voice input device according to the invention, the amplitude difference detection section may include band-pass filters that respectively allow the first voltage signal and the second voltage signal input to the differential signal output section to pass through in a band around the single frequency, the amplitude difference detection section detecting a difference in amplitude between the first voltage signal and the second voltage signal that have passed through the band-pass filters, and generating the amplitude difference signal based on the detection result.

According to the invention, an accurate adjustment by selectively utilizing a sound signal from the sound source section can be implemented. A variation in gain of the microphone that changes due to the usage state (usage environment or duration) can be detected intermittently or in real time and adjusted.

(10) In the voice input device according to the invention, the differential signal generation section may include a low-pass filter section that blocks a high-frequency component of the differential signal.

Since a differential microphone has characteristics in that a high-frequency component of sound is enhanced (the gain increases), high-frequency noise may be offensive to human ears. The frequency characteristics can be made flat by attenuating the high-frequency component of the differential signal using the low-pass filter. This prevents incorrect audibility.

(11) In the voice input device according to the invention, the low-pass filter section may be a filter having first-order cut-off properties.

Since the high frequency range of the differential signal linearly increases (20 dB/dec), the frequency characteristics of the differential signal can be maintained flat by attenuating the high frequency range using a first-order low-pass filter having opposite characteristics. Therefore, incorrect audibility can be prevented.

(12) In the voice input device according to the invention, the low-pass filter section may have a cut-off frequency in a range from 1 kHz to 5 kHz.

If the cut-off frequency of the low-pass filter section is set at a low value, sound becomes indistinct. If the cut-off frequency of the low-pass filter section is set at a high value, high-frequency noise is offensive. Therefore, it is preferable to set the cut-off frequency of the low-pass filter section at an appropriate value corresponding to the distance between the microphones. An optimum cut-off frequency varies depending on the distance between the microphones. For example, when the distance between the microphones is about 5 mm, the cut-off frequency of the low-pass filter section is preferably set in the range from 1.5 kHz to 2 kHz.

(13) The voice input device according to the invention may further comprise:

first AD conversion means that subjects the first voltage signal to analog-to-digital conversion; and second AD conversion means that subjects the second voltage signal to analog-to-digital conversion, wherein the differential signal generation section generates a differential signal that indicates a difference between the first voltage signal that has been converted into a digital signal by the first AD conversion means and the second voltage signal that has been converted into a digital signal by the second AD conversion means based on the first voltage signal and the second voltage signal.

(14) According to the invention, there is provided a voice input device comprising:

a first microphone that includes a first diaphragm;

a second microphone that includes a second diaphragm; and a differential signal generation section that generates a differential signal that indicates a difference between a first voltage signal obtained by the first microphone and a second voltage signal obtained by the second microphone, the first diaphragm and the second diaphragm being disposed so that a noise intensity ratio that indicates a ratio of intensity of a noise component contained in the differential signal to intensity of the noise component contained in the first voltage signal or the second voltage signal, is smaller than an input voice intensity ratio that indicates a ratio of intensity of an input voice component contained in the differential signal to intensity of the input voice component contained in the first voltage signal or the second voltage signal.

According to this voice input device, the first microphone and the second microphone (first diaphragm and second diaphragm) are disposed to satisfy a predetermined condition. Therefore, the differential signal that indicates the difference between the first voltage signal and the second voltage signal obtained by the first microphone and the second microphone can be considered to be a signal that indicates the input voice from which a noise component has been removed. Accordingly, the invention can provide a voice input device that can implement a noise removal function by a simple configuration that merely generates the differential signal.

The differential signal generation section of the voice input device generates the differential signal without performing an analysis process (e.g., Fourier analysis) on the first voltage signal and the second voltage signal. Therefore, the signal processing load of the differential signal generation section can be reduced, or the differential signal generation section can be implemented by a very simple circuit.

Accordingly, the invention can provide a voice input device that can be reduced in size and can implement a highly accurate noise removal function.

In this voice input device, the first diaphragm and the second diaphragm may be disposed so that the intensity ratio based on the phase difference component of the noise component is smaller than the intensity ratio based on the amplitude of the input voice component.

(15) The voice input device according to the invention may further comprise:

a base, a depression being formed in a main surface of the base, wherein the first diaphragm is disposed on a bottom surface of the depression; and wherein the second diaphragm is disposed on the main surface.

(16) In the voice input device according to the invention, the base may be provided so that an opening that communicates with the depression is disposed closer to an input voice model sound source than a formation area of the second diaphragm on the main surface.

According to this voice input device, the difference in phase of the input voice that enters the first diaphragm and the second diaphragm can be reduced. Therefore, a voice input device that can generate a differential signal that contains only a small amount of noise and implement a highly accurate noise removal function can be provided.

(17) In the voice input device according to the invention, the depression may be shallower than a distance between the opening and the formation area of the second diaphragm.

(18) The voice input device according to the invention may further comprise:

a base, a first depression and a second depression that is shallower than the first depression being formed in a main surface of the base, wherein the first diaphragm is disposed on a bottom surface of the first depression; and wherein the second diaphragm is disposed on a bottom surface of the second depression.

(19) In the voice input device according to the invention, the base may be provided so that a first opening that communicates with the first depression is disposed closer to an input voice model sound source than a second opening that communicates with the second depression.

According to this voice input device, the difference in phase of the input voice that enters the first diaphragm and the second diaphragm can be reduced. Therefore, a voice input device that can generate a differential signal that contains only a small amount of noise and implement a highly accurate noise removal function can be provided.

(20) In the voice input device according to the invention, a difference in depth between the first depression and the second depression may be smaller than a distance between the first opening and the second opening.

(21) In the voice input device according to the invention, the base may be provided so that an input voice reaches the first diaphragm and the second diaphragm at the same time.

Therefore, since a differential signal that does not contain an input voice phase difference can be generated, a voice input device having a highly accurate noise removal function can be provided.

(22) In the voice input device according to the invention, the first diaphragm and the second diaphragm may be disposed so that a normal to the first diaphragm is parallel to a normal to the second diaphragm.

(23) In the voice input device according to the invention, the first diaphragm and the second diaphragm may be disposed so that the first diaphragm and the second diaphragm do not overlap in a direction perpendicular to a normal direction.

(24) In the voice input device according to the invention, the first microphone and the second microphone may be formed as a semiconductor device.

For example, the first microphone and the second microphone may be silicon microphones (Si microphones). The first microphone and the second microphone may be formed on a single semiconductor substrate. In this case, the first microphone, the second microphone, and the differential signal generation section may be formed on a single semiconductor substrate. The first microphone, the second microphone, and the differential signal generation section may be formed as a micro-electro-mechanical system (MEMS). The diaphragm may be an inorganic piezoelectric thin film or an organic piezoelectric thin film (i.e., the diaphragm achieves sound-electric conversion utilizing a piezoelectric effect).

(25) In the voice input device according to the invention, a center-to-center distance between the first diaphragm and the second diaphragm may be 5.2 mm or less.

The first diaphragm and the second diaphragm may be disposed so that the normal to the first diaphragm extends parallel to the normal to the second diaphragm at an interval of 5.2 mm or less.

(26) According to the invention, there is provided an information processing system comprising:

the above voice input device; and an analysis section that analyzes voice information input to the voice input device based on the differential signal.

According to this information processing system, the voice information is analyzed based on the differential signal obtained by the voice input device in which the first diaphragm and the second diaphragm are disposed to satisfy a predetermined condition. Since the differential signal is a signal that indicates a voice component from which a noise component has been removed, various types of information processing based on the input voice can be performed by analyzing the differential signal.

The information processing system according to the invention may perform a voice recognition process, a voice authentication process, or a command generation process based on voice, for example.

(27) According to the invention, there is provided an information processing system comprising:

the above voice input device; and a host computer that analyzes voice information input to the voice input device based on the differential signal, the voice input device communicating with the host computer through a network via a communication section.

According to this information processing system, the voice information is analyzed based on the differential signal obtained by the voice input device in which the first diaphragm and the second diaphragm are disposed to satisfy a predetermined condition. Since the differential signal is a signal that indicates a voice component from which a noise component has been removed, various types of information processing based on the input voice can be performed by analyzing the differential signal.

The information processing system according to the invention may perform a voice recognition process, a voice authentication process, or a command generation process based on voice, for example.

(28) According to the invention, there is provided a method of producing a voice input device that has a function of removing a noise component and includes a first microphone that includes a first diaphragm, a second microphone that includes a second diaphragm, and a differential signal generation section that generates a differential signal that indicates a difference between a first voltage signal obtained by the first microphone and a second voltage signal obtained by the second microphone, the method comprising:

providing data that indicates a relationship between a ratio $\Delta r/\lambda$ and a noise intensity ratio, the ratio $\Delta r/\lambda$ indicating a ratio of a center-to-center distance $\Delta r$ between the first diaphragm and the second diaphragm to a wavelength $\lambda$ of noise, and the noise intensity ratio indicating a ratio of intensity of the noise component contained in the differential signal to intensity of the noise component contained in the first voltage signal or the second voltage signal;

setting the ratio $\Delta r/\lambda$ based on the data; and setting the center-to-center distance based on the ratio $\Delta r/\lambda$ that has been set based on the data and the wavelength of the noise.

According to the invention, a method of producing a voice input device that can be reduced in size and can implement a highly accurate noise removal function can be provided.

(29) In the method of producing a voice input device according to the invention, the ratio $\Delta r/\lambda$ may be set so that so that the noise intensity ratio is smaller than an input voice intensity ratio that indicates a ratio of intensity of an input voice component contained in the differential signal to intensity of the input voice component contained in the first voltage signal or the second voltage signal.

(30) In the method of producing a voice input device according to the invention, the input voice intensity ratio may be an intensity ratio based on an amplitude component of the input voice.

(31) In the method of producing a voice input device according to the invention, the noise intensity ratio may be an intensity ratio based on a phase difference of the noise component.

(32) In the method of producing a voice input device according to the invention, the differential signal generation section of the voice input device may include: a gain section that amplifies the first voltage signal obtained by the first microphone by a predetermined gain based on a voltage applied to a predetermined terminal or a current that flows through the predetermined terminal; a gain control section that controls the voltage applied to the predetermined terminal or the current that flows through the predetermined terminal; and a differential signal output section that receives the first voltage signal amplified by the gain section and the second voltage signal obtained by the second microphone, generates a differential signal that indicates a difference between the first voltage signal amplified by the gain section and the second voltage signal, and outputs the differential signal, the method further comprising forming the gain control section using a resistor array in which a plurality of resistors are connected in series or parallel, and cutting some of the plurality of resistors or conductors that form the resistor array, or forming the gain control section using at least one resistor, and cutting part of the at least one resistor.

(33) The method of producing a voice input device according to the invention may further comprise:

providing a sound source section at an equal distance from the first microphone and the second microphone; and determining a difference in amplitude between the first microphone and the second microphone based on sound output from the sound source section, and cutting some of the plurality of resistors or conductors that form the resistor array or part of the at least one resistor to achieve a resistance that allows the difference in amplitude to be within a predetermined range.

BEST MODE FOR CARRYING OUT THE INVENTION

Embodiments to which the invention is applied are described below with reference to the drawings. Note that the invention is not limited to the following embodiments. The invention encompasses any combinations of the elements of the following embodiments.

1. Configuration of Voice Input Device According to First Embodiment

Figure 1:
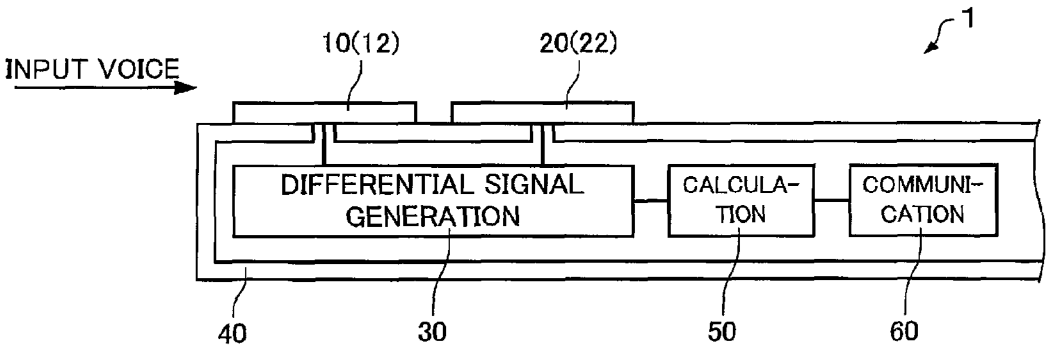
FIG. 1 illustrates a voice input device.
Figure 2:
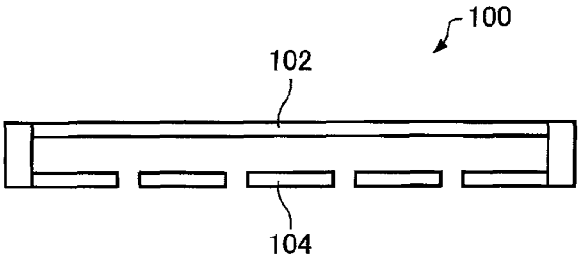
FIG. 2 illustrates a voice input device.

The configuration of a voice input device 1 according to one embodiment to which the invention is applied is described below with reference to FIGS. 1 to 3. The voice input device 1 is a close-talking voice input device, and may be applied to voice communication instruments (e.g., portable telephone and transceiver), information processing systems utilizing input voice analysis technology (e.g., voice authentication system, voice recognition system, command generation system, electronic dictionary, translation device, and voice input remote controller), recording instruments, amplifier systems (loudspeaker), microphone systems, and the like.

The voice input device 1 according to this embodiment includes a first microphone 10 that includes a first diaphragm 12, and a second microphone 20 that includes a second diaphragm 22. The term "microphone" used herein refers to an electro-acoustic transducer that converts an acoustic signal into an electrical signal. The first second microphone 10 and the second microphone 20 may be converters that respectively output vibrations of the first diaphragm 12 and the second diaphragm 22 as voltage signals.

In the voice input device according to this embodiment, the first microphone 10 generates a first voltage signal. The second microphone 20 generates a second voltage signal. Specifically, the voltage signal generated by the first microphone 10 and the voltage signal generated by the second microphone 20 may be referred to as a first voltage signal and a second voltage signal, respectively.

The mechanisms of the first microphone 10 and the second microphone 20 are not particularly limited. FIG. 2 illustrates the structure of a capacitor-type microphone 100 as an example of a microphone that may be applied to the first microphone 10 and the second microphone 20. The capacitor-type microphone 100 includes a diaphragm 102. The diaphragm 102 is a film (thin film) that vibrates due to sound waves. The diaphragm 102 has conductivity and forms an electrode. The capacitor-type microphone 100 includes an electrode 104. The electrode 104 is disposed opposite to the diaphragm 102. The diaphragm 102 and the electrode 104 thus form a capacitor. When sound waves enter the capacitor-type microphone 100, the diaphragm 102 vibrates so that the distance between the diaphragm 102 and the electrode 104 changes, whereby the capacitance between the diaphragm 102 and the electrode 104 changes. The sound waves that have entered the capacitor-type microphone 100 can be converted into an electrical signal by outputting the change in capacitance as a change in voltage, for example. In the capacitor-type microphone 100, the electrode 104 may have a structure that is not affected by sound waves. For example, the electrode 104 may have a mesh structure.

Note that the microphone that may be applied to the invention is not limited to a capacitor-type microphone. A known microphone may be applied to the invention. For example, an electrokinetic (dynamic) microphone, an electromagnetic (magnetic) microphone, a piezoelectric (crystal) microphone, or the like may be used as the first microphone 10 and the second microphone 20.

The first microphone 10 and the second microphone 20 may be silicon microphones (Si microphones) in which the first diaphragm 12 and the second diaphragm 22 are formed of silicon. A reduction in size and an increase in performance of the first microphone 10 and the second microphone 20 can be achieved by utilizing the silicon microphones. In this case, the first microphone 10 and the second microphone 20 may be formed as a single integrated circuit device. Specifically, the first microphone 10 and the second microphone 20 may be formed on a single semiconductor substrate. A differential signal generation section 30 described later may also be formed on the semiconductor substrate on which the first microphone 10 and the second microphone 20 are formed. Specifically, the first microphone 10 and the second microphone 20 may be formed as a micro-electro-mechanical system (MEMS). Note that the first microphone 10 and second microphone 20 may be formed as separate silicon microphones.

The voice input device according to this embodiment implements a function of removing a noise component by utilizing a differential signal that indicates the difference between the first voltage signal and the second voltage signal, as described later. The first microphone and the second microphone (first diaphragm 12 and second diaphragm 22) are disposed to satisfy predetermined conditions in order to implement the above-mentioned function. The details of the conditions to be satisfied by the first diaphragm 12 and second diaphragm 22 are described later. In this embodiment, the first diaphragm 12 and the second diaphragm 22 (first microphone 10 and second microphone 20) are disposed so that a noise intensity ratio is smaller than an input voice intensity ratio. Therefore, the differential signal can be considered to be a signal that indicates a voice component from which a noise component has been removed. The first diaphragm 12 and the second diaphragm 22 may be disposed so that the center-to-center distance between the first diaphragm 12 and the second diaphragm 22 is 5.2 mm or less, for example.

In the voice input device according to this embodiment, the directions of the first diaphragm 12 and the second diaphragm 22 are not particularly limited. The first diaphragm 12 and the second diaphragm 22 may be disposed so that the normal to the first diaphragm 12 extends parallel to the normal to the second diaphragm 22. In this case, the first diaphragm 12 and the second diaphragm 22 may be disposed so that the first diaphragm 12 and the second diaphragm 22 do not overlap in the direction perpendicular to the normal direction. For example, the first diaphragm 12 and the second diaphragm 22 may be disposed at an interval on the surface of a base (e.g., circuit board) (not shown). Alternatively, the first diaphragm 12 and the second diaphragm 22 may be disposed at an interval in the normal direction. The first diaphragm 12 and the second diaphragm 22 may be disposed so that the normal to the first diaphragm 12 does not extend parallel to the normal to the second diaphragm 22. The first diaphragm 12 and the second diaphragm 22 may be disposed so that the normal to the first diaphragm 12 perpendicularly intersects the normal to the second diaphragm 22.

The voice input device according to this embodiment includes the differential signal generation section 30. The differential signal generation section 30 generates a differential signal that indicates the difference (voltage difference) between the first voltage signal obtained by the first microphone 10 and the second voltage signal obtained by the second microphone 20. The differential signal generation section 30 generates the differential signal that indicates the difference between the first voltage signal and the second voltage signal in the time domain without performing an analysis process (e.g., Fourier analysis) on the first voltage signal and the second voltage signal. The function of the differential signal generation section 30 may be implemented by a dedicated hardware circuit (differential signal generation section), or may be implemented by signal processing using a CPU or the like.

The voice input device according to this embodiment may further include a gain section that amplifies the differential signal (i.e., increases or decreases the gain). The differential signal generation section 30 and the gain section may be implemented by a single control circuit. Note that the voice input device according to this embodiment may not include the gain section.

Figure 3:
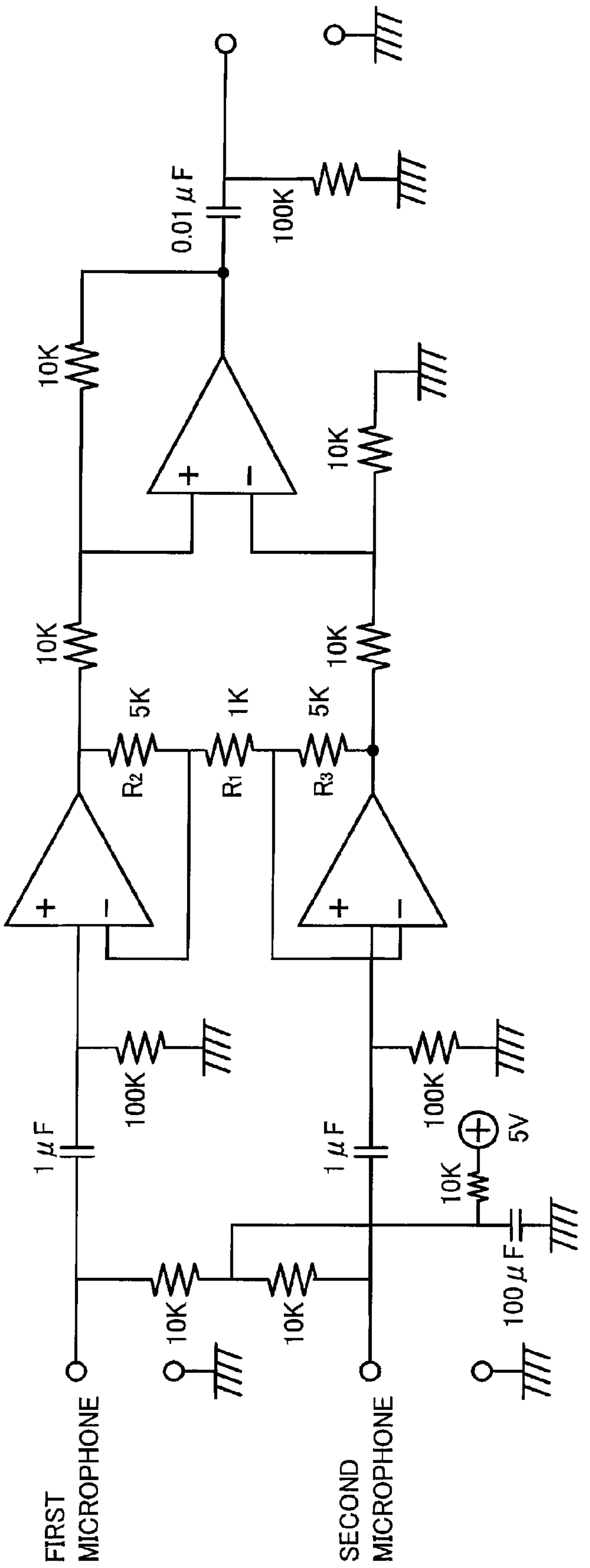
FIG. 3 illustrates a voice input device.

FIG. 3 illustrates an example of a circuit that can implement the differential signal generation section 30 and the gain section. The circuit illustrated in FIG. 3 receives the first voltage signal and the second voltage signal, and outputs a signal obtained by amplifying the differential signal that indicates the difference between the first voltage signal and the second voltage signal by a factor of 10. Note that the circuit configuration that implements the differential signal generation section 30 and the gain section is not limited to the circuit configuration in FIG. 3.

The voice input device according to this embodiment may include a housing 40. In this case, the external shape of the voice input device may be defined by the housing 40. A basic position that limits the travel path of the input voice may be set for the housing 40. The first diaphragm 12 and the second diaphragm 22 may be formed on the surface of the housing 40. Alternatively, the first diaphragm 12 and the second diaphragm 22 may be disposed in the housing 40 to face openings (voice incident openings) formed in the housing 40. The first diaphragm 12 and the second diaphragm 22 may be disposed so that the first diaphragm 12 and the second diaphragm 22 differ in distance from the sound source (incident voice model sound source). As illustrated in FIG. 1, the basic position of the housing 40 may be set so that the travel path of the input voice extends along the surface of the housing 40, for example. The first diaphragm 12 and the second diaphragm 22 may be disposed along the travel path of the input voice. The first diaphragm 12 may be disposed on the upstream side of the travel path of the input voice, and the second diaphragm 22 may be disposed on the downstream side of the travel path of the input voice.

The voice input device according to this embodiment may further include a calculation section 50. The calculation section 50 performs various calculation processes based on the differential signal generated by the differential signal generation section 30. The calculation section 50 may analyze the differential signal. The calculation section 50 may specify a person who has produced the input voice by analyzing the differential signal (i.e., voice authentication process). The calculation section 50 may specify the content of the input voice by analyzing the differential signal (i.e., voice recognition process). The calculation section 50 may create various commands based on the input voice. The calculation section 50 may amplify the differential signal. The calculation section 50 may control the operation of a communication section 60 described later. The calculation section 50 may implement the above-mentioned functions by signal processing using a CPU and a memory.

The calculation section 50 may be disposed inside or outside the housing 40. When the calculation section 50 is disposed outside the housing 40, the calculation section 50 may acquire the differential signal through the communication section 60.

The voice input device according to this embodiment may further include the communication section 60. The communication section 60 controls communication between the voice input device and another terminal (e.g., portable telephone terminal or host computer). The communication section 60 may have a function of transmitting a signal (differential signal) to another terminal through a network. The communication section 60 may have a function of receiving a signal from another terminal through a network. A host computer may analyze the differential signal acquired through the communication section 60, and perform various types of information processing such as a voice recognition process, a voice authentication process, a command generation process, and a data storage process. Specifically, the voice input device may form an information processing system together with another terminal. In other words, the voice input device may be considered to be an information input terminal that forms an information processing system. Note that the voice input device may not include the communication section 60.

The voice input device according to this embodiment may further include a display device (e.g., display panel) and a sound output device (e.g., loudspeaker). The voice input device according to this embodiment may further include an operation key that allows the user to input operation information.

The voice input device according to this embodiment may have the above-described configuration. This voice input device generates a signal (voltage signal) that indicates a voice component from which a noise component has been removed by a simple process that merely outputs the difference between the first voltage signal and the second voltage signal. According to the invention, a voice input device that can be reduced in size and has an excellent noise removal function can thus be provided. The noise removal principle is described later.

2. Noise Removal Function

The noise removal principle employed for the voice input device according to the embodiment and conditions for implementing the principle are described below.

(1) Noise Removal Principle

The noise removal principle of the voice input device according to the embodiment is as follows.

Figure 4:
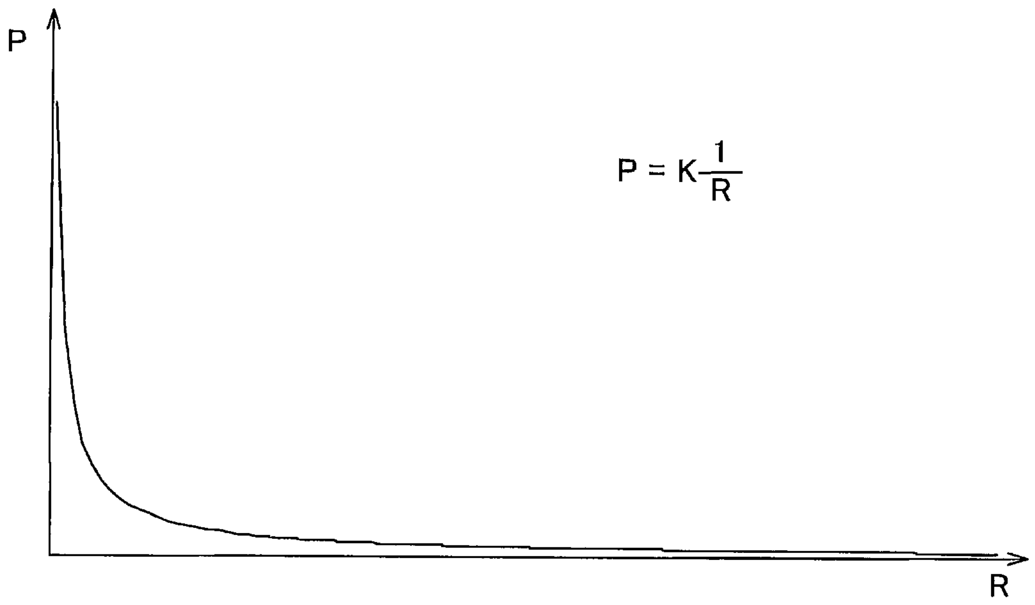
FIG. 4 illustrates a voice input device.

Sound waves are attenuated during travel through a medium so that the sound pressure (i.e., the intensity/amplitude of the sound waves) decreases. Since the sound pressure is in inverse proportion to the distance from the sound source, a sound pressure P is expressed by the following expression with respect to the relationship with a distance r from the sound source, $$P = K\frac{1}{R} \tag{1}$$

where, k is a proportional constant. FIG. 4 is a graph that illustrates the expression (1). As illustrated in FIG. 4, the sound pressure (amplitude of sound waves) is rapidly attenuated at a position near the sound source (left of the graph), and is gently attenuated as the distance from the sound source increases. The voice input device according to this embodiment removes a noise component by utilizing the above-mentioned attenuation characteristics.

Specifically, the user of the close-talking voice input device talks at a position closer to the first microphone 10 and the second microphone 20 (first diaphragm 12 and second diaphragm 22) than the noise source. Therefore, the user's voice is attenuated to a large extent between the first diaphragm 12 and the second diaphragm 22 so that a difference in intensity occurs between the user's voice contained in the first voltage signal and the user's voice contained in the second voltage signal. On the other hand, since the source of a noise component is situated at a position away from the voice input device as compared with the user's voice, the noise component is attenuated to only a small extent between the first diaphragm 12 and the second diaphragm 22. Therefore, a substantial difference in intensity does not occur between the noise contained in the first voltage signal and the noise contained in the second voltage signal. Therefore, since noise is removed by detecting the difference between the first voltage signal and the second voltage signal, a voltage signal (differential signal) that indicates only the user's voice component and does not contain the noise component can be acquired. Specifically, the differential signal can be considered to be a signal that indicates the user's voice from which the noise component has been removed.

However, sound waves contain a phase component. Therefore, the phase difference between the voice components and the noise components contained in the first voltage signal and the second voltage signal must be taken into consideration in order to implement a reliable noise removal function.

Specific conditions that must be satisfied by the voice input device in order to implement the noise removal function by generating the differential signal are described below.

(2) Specific Conditions that Must be Satisfied by Voice Input Device

The voice input device according to this embodiment considers the differential signal that indicates the difference between the first voltage signal and the second voltage signal to be an input voice signal that does not contain noise, as described above. According to this voice input device, it is considered that the noise removal function has been implemented when a noise component contained in the differential signal has become smaller than a noise component contained in the first voltage signal or the second voltage signal. Specifically, it is considered that the noise removal function has been implemented when a noise intensity ratio that indicates the ratio of the intensity of a noise component contained in the differential signal to the intensity of a noise component contained in the first voltage signal or the second voltage signal has become smaller than a voice intensity ratio that indicates the ratio of the intensity of a voice component contained in the differential signal to the intensity of a voice component contained in the first voltage signal or the second voltage signal.

Specific conditions that must be satisfied by the voice input device (first diaphragm 12 and second diaphragm 22) in order to implement the noise removal function are described below.

The sound pressures of a voice that enters the first microphone 10 and the second microphone 20 (first diaphragm 12 and second diaphragm 22) are discussed below. When the distance from the sound source of the input voice (user's voice) to the first diaphragm 12 is referred to as R, the sound pressures (intensities) P(S1) and P(S2) of the input voice that enters the first microphone 10 and the second microphone 20 are expressed as follows (the phase difference is disregarded).

$$\begin{cases} P(S1) = K\dfrac{1}{R} & (2) \\ P(S2) = K\dfrac{1}{R+\Delta r} & (3) \end{cases}$$

Therefore, a voice intensity ratio ρ(P) that indicates the ratio of the intensity of the input voice component contained in the differential signal to the intensity of the input voice component obtained by the first microphone 10 is expressed as follows.

$$\rho(P) = \frac{P(S1) - P(S2)}{P(S1)} = \frac{\Delta r}{R + \Delta r} \quad (4)$$

Since the voice input device according to this embodiment is a close-talking voice input device, the center-to-center distance Δr can be considered to be sufficiently smaller than the distance R.

Therefore, the expression (4) can be transformed as follows.

$$\rho(P) = \frac{\Delta r}{R} \quad (A)$$

Specifically, the voice intensity ratio when disregarding the phase difference of the input voice is expressed by the expression (A).

The sound pressures Q(S1) and Q(S2) of the user's voice are expressed as follows when the phase difference of the input voice is taken into consideration, $$\begin{cases} Q(S1) = K\dfrac{1}{R}\sin\omega t & (5) \\ Q(S2) = K\dfrac{1}{R+\Delta r}\sin(\omega t - \alpha) & (6) \end{cases}$$

where, α is the phase difference.

The voice intensity ratio ρ(S) is then:

$$\rho(S) = \frac{|P(S1) - P(S2)|_{max}}{|P(S1)|_{max}} = \frac{\left|\frac{K}{R}\sin\omega t - \frac{K}{R+\Delta r}\sin(\omega t - \alpha)\right|_{max}}{\left|\frac{K}{R}\sin\omega t\right|_{max}} \quad (7)$$

The voice intensity ratio ρ(S) may then be expressed as follows based on the expression (7).

$$\begin{aligned} \rho(S) &= \frac{\frac{K}{R}\left|\sin\omega t - \frac{1}{1+\Delta r/R}\sin(\omega t - \alpha)\right|_{max}}{\frac{K}{R}|\sin\omega t|_{max}} \quad (8) \\ &= \frac{1}{1+\Delta r/R}|(1+\Delta r/R)\sin\omega t - \sin(\omega t - \alpha)|_{max} \\ &= \frac{1}{1+\Delta r/R}\left|\sin\omega t - \sin(\omega t - \alpha) + \frac{\Delta r}{R}\sin\omega t\right|_{max} \end{aligned}$$

In the expression (8), the term sin ωt−sin(ω−α) indicates the phase component intensity ratio, and the term Δr/R sin ωt indicates the amplitude component intensity ratio. Since the phase difference component as the input voice component serves as noise for the amplitude component, the phase component intensity ratio must be sufficiently smaller than the amplitude component intensity ratio in order to accurately extract the input voice (user's voice). Specifically, it is necessary that sin ωt−sin(ωt−α) and Δr/R sin ωt satisfy the following relationship.

$$\left|\frac{\Delta r}{R}\sin\omega t\right|_{max} > |\sin\omega t - \sin(\omega t - \alpha)|_{max} \tag{B}$$

Since sin ωt−sin(ωt−α) is expressed as follows, $$\sin\omega t - \sin(\omega t - \alpha) = 2\sin\frac{\alpha}{2}\cdot\cos\left(\omega t - \frac{\alpha}{2}\right) \tag{9}$$

the expression (B) may then be expressed as follows.

$$\left|\frac{\Delta r}{R}\sin\omega t\right|_{max} > \left|2\sin\frac{\alpha}{2}\cdot\cos\left(\omega t - \frac{\alpha}{2}\right)\right|_{max} \tag{10}$$

Taking the amplitude component in the expression (10) into consideration, the voice input device according to this embodiment must satisfy the following expression.

$$\frac{\Delta r}{R} > 2\sin\frac{\alpha}{2} \tag{C}$$

Since the center-to-center distance Δr is considered to be sufficiently smaller than the distance R, as described above, sin(α/2) can be considered to be sufficiently small and approximated as follows.

$$\sin\frac{\alpha}{2} \approx \frac{\alpha}{2} \tag{11}$$

Therefore, the expression (C) can be transformed as follows.

$$\frac{\Delta r}{R} > \alpha \tag{D}$$

When the relationship between the phase difference α and the center-to-center distance Δr is expressed as follows, $$\alpha = \frac{2\pi\Delta r}{\lambda} \tag{12}$$

the expression (D) can be transformed as follows.

$$\frac{\Delta r}{R} > 2\pi\frac{\Delta r}{\lambda} > \frac{\Delta r}{\lambda} \tag{E}$$

Specifically, the voice input device according to this embodiment must be produced to satisfy the relationship shown by the expression (E) in order to accurately extract the input voice (user's voice).

The sound pressures of noise that enters the first microphone 10 and the second microphone 20 (first diaphragm 12 and second diaphragm 22) are discussed below.

When the amplitudes of noise components obtained by the first microphone 10 and the second microphone 20 are referred to as A and A', sound pressures Q(N1) and Q(N2) of noise are expressed as follows when taking a phase difference component into consideration.

$$\begin{cases} Q(N1) = A\sin\omega t & (13) \\ Q(N2) = A'\sin(\omega t - \alpha) & (14) \end{cases}$$

A noise intensity ratio ρ(N) that indicates the ratio of the intensity of the noise component contained in the differential signal to the intensity of the noise component obtained by the first microphone 10 is expressed as follows.

$$\begin{aligned}\rho(N) &= \frac{|Q(N1) - Q(N2)|_{max}}{|Q(N1)|_{max}} \\ &= \frac{|A\sin\omega t - A'\sin(\omega t - \alpha)|_{max}}{|A\sin\omega t|_{max}}\end{aligned} \tag{15}$$

The amplitudes (intensities) of noise components obtained by the first microphone and the second microphone are almost identical (i.e., A=A'), as described above. Therefore, the expression (15) can be transformed as follows.

$$\rho(N) = \frac{|\sin\omega t - \sin(\omega t - \alpha)|_{max}}{|\sin\omega t|_{max}} \tag{16}$$

The noise intensity ratio is expressed as follows.

$$\begin{aligned}\rho(N) &= \frac{|\sin\omega t - \sin(\omega t - \alpha)|_{max}}{|\sin\omega t|_{max}} \\ &= |\sin\omega t - \sin(\omega t - \alpha)|_{max}\end{aligned} \tag{17}$$

The expression (17) can be transformed as follows based on the expression (9).

$$\begin{aligned}\rho(N) &= \left|\cos\left(\omega t - \frac{\alpha}{2}\right)\right|_{max}\cdot 2\sin\frac{\alpha}{2} \\ &= 2\sin\frac{\alpha}{2}\end{aligned} \tag{18}$$

The expression (18) can be transformed as follows based on the expression (11).

$$\rho(N) = \alpha \tag{19}$$

The noise intensity ratio is expressed as follows based on the expression (D).

$$\rho(N) = \alpha < \frac{\Delta r}{R} \tag{F}$$

Note that Δr/R indicates the amplitude component intensity ratio of the input voice (user's voice), as indicated by the expression (A). In the voice input device, the noise intensity ratio is smaller than the intensity ratio Δr/R of the input voice, as is clear from the expression (F).

According to the voice input device that is designed so that the phase component intensity ratio of the input voice is smaller than the amplitude component intensity ratio (see the expression (B)), the noise intensity ratio is smaller than the input voice intensity ratio (see the expression (F)). In other words, the voice input device that is designed so that the noise intensity ratio is smaller than the input voice intensity ratio can implement a highly accurate noise removal function.

Specifically, the voice input device according to this embodiment in which the first diaphragm 12 and the second diaphragm 22 (first microphone 10 and second microphone 20) are disposed so that the noise intensity ratio is smaller than the input voice intensity ratio can implement a highly accurate noise removal function.

3. Method of Producing Voice Input Device

A method of producing the voice input device according to this embodiment is described below. In this embodiment, the voice input device is produced utilizing data that indicates the relationship between the noise intensity ratio (intensity ratio based on the phase component of noise) and the ratio $\Delta r/\lambda$ that indicates the ratio of the center-to-center distance $\Delta r$ between the first diaphragm 12 and the second diaphragm 22 to a wavelength $\lambda$ of noise.

The intensity ratio based on the phase component of noise is expressed by the expression (18). Therefore, the decibel value of the intensity ratio based on the phase component of noise is expressed as follows.

$$20\log\rho(N) = 20\log\left|2\sin\frac{\alpha}{2}\right| \tag{20}$$

Figure 5:
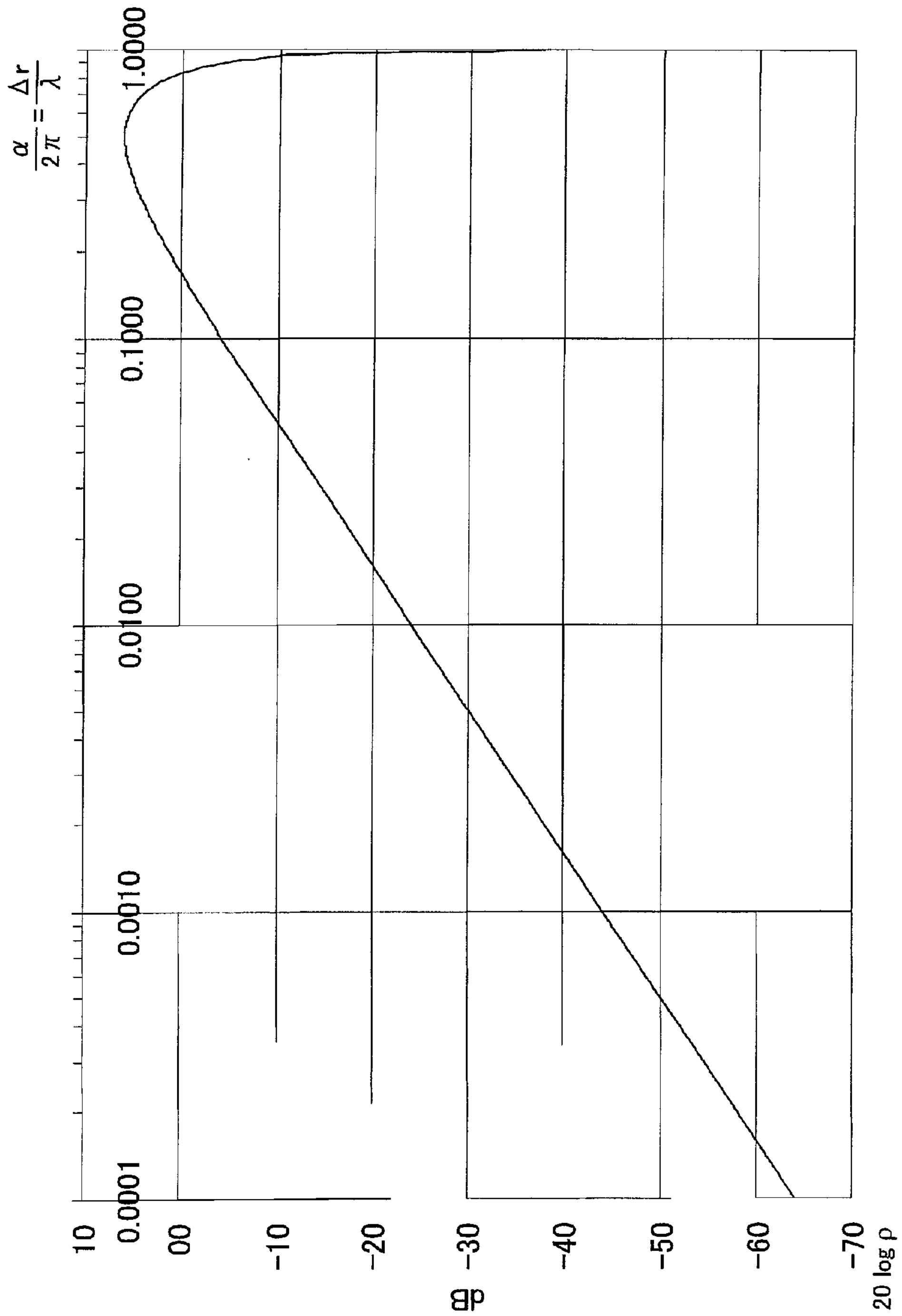
FIG. 5 illustrates a method of producing a voice input device.

The relationship between the phase difference $\alpha$ and the intensity ratio based on the phase component of noise can be determined by substituting each value for $\alpha$ in the expression (20). FIG. 5 illustrates an example of data that indicates the relationship between the phase difference and the intensity ratio wherein the horizontal axis indicates $\alpha/2\pi$ and the vertical axis indicates the intensity ratio (decibel value) based on the phase component of noise.

The phase difference a can be expressed as a function of the ratio $\Delta r/\lambda$ that indicates the ratio of the distance $\Delta r$ to the wavelength $\lambda$, as indicated by the expression (12). Therefore, the vertical axis in FIG. 5 is considered to indicate the ratio $\Delta r/\lambda$. Specifically, FIG. 5 illustrates data that indicates the relationship between the intensity ratio based on the phase component of noise and the ratio $\Delta r/\lambda$.

Figure 6:
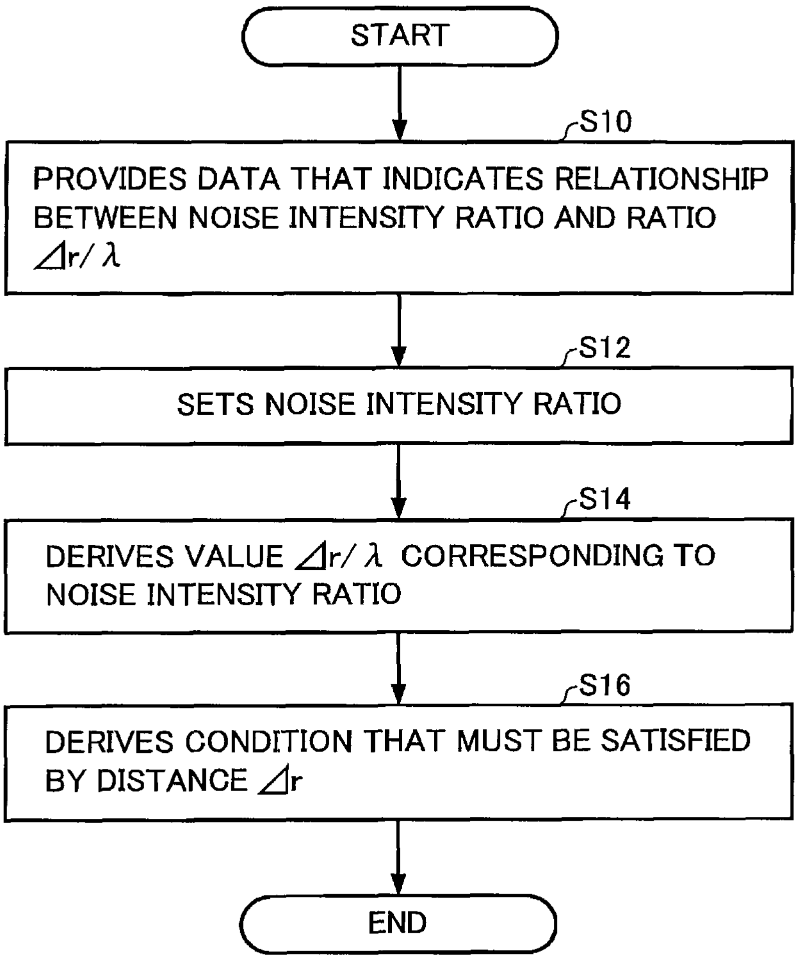
FIG. 6 illustrates a method of producing a voice input device.

In this embodiment, the voice input device is produced utilizing the data illustrated in FIG. 5. FIG. 6 is a flowchart illustrating a process of producing the voice input device utilizing the data shown in FIG. 5.

First, data that indicates the relationship between the noise intensity ratio (intensity ratio based on the phase component of noise) and the ratio $\Delta r/\lambda$ (refer to FIG. 5) is provided (step S10).

The noise intensity ratio is set corresponding to the application (step S12). In this embodiment, the noise intensity ratio must be set so that the intensity of noise decreases. Therefore, the noise intensity ratio is set to be 0 dB or less in this step.

A value $\Delta r/\lambda$ corresponding to the noise intensity ratio is derived based on the data (step S14).

A condition that must be satisfied by the distance $\Delta r$ is derived by substituting the wavelength of the main noise for $\lambda$ (step S16).

A specific example in which the frequency of the main noise is 1 KHz and a voice input device that reduces the intensity of the noise by 20 dB is produced in an environment in which the wavelength of the noise is 0.347 m is discussed below.

A condition necessary for the noise intensity ratio to become 0 dB or less is as follows. As illustrated in FIG. 5, the noise intensity ratio can be set at 0 dB or less by setting the value $\Delta r/\lambda$ at 0.16 or less. Specifically, the noise intensity ratio can be set at 0 dB or less by setting the distance $\Delta r$ at 55.46 mm or less. This is a necessary condition for the voice input device.

A condition necessary for reducing the intensity of noise having a frequency of 1 KHz by 20 dB is as follows. As illustrated in FIG. 5, the intensity of noise can be reduced by 20 dB by setting the value $\Delta r/\lambda$ at 0.015. When $\lambda$=0.347 m, this condition is satisfied when the distance $\Delta r$ is 5.20 mm or less. Specifically, a close-talking sound input device having a noise removal function can be produced by setting the distance $\Delta r$ at about 5.2 mm or less.

Since the voice input device according to the embodiment is a close-talking voice input device, the distance between the sound source of the user's voice and the first diaphragm 12 or the second diaphragm 22 is normally 5 cm or less. The distance between the sound source of the user's voice and the first diaphragm 12 or the second diaphragm 22 can be controlled by changing the design of the housing 40. Therefore, the intensity ratio $\Delta r/R$ of the input voice (user's voice) becomes larger than 0.1 (noise intensity ratio) so that the noise removal function is implemented.

Note that noise is not normally limited to a single frequency. However, since the wavelength of noise having a frequency lower than that of noise considered to be the main noise is longer than that of the main noise, the value $\Delta r/\lambda$ decreases so that the noise is removed by the voice input device. The energy of sound waves is attenuated more quickly as the frequency becomes higher. Therefore, since the wavelength of noise having a frequency higher than that of noise considered to be the main noise is attenuated more quickly than the main noise, the effect of the noise on the voice input device can be disregarded. Therefore, the voice input device according to this embodiment exhibits an excellent noise removal function even in an environment in which noise having a frequency differing from that of noise considered to be the main noise is present.

This embodiment has been described taking an example in which noise enters along a straight line that connects the first diaphragm 12 and the second diaphragm 22, as is clear from the expression (12). In this case, the apparent distance between the first diaphragm 12 and the second diaphragm 22 becomes a maximum, and the noise has the largest phase difference in an actual usage environment. Specifically, the voice input device according to this embodiment is configured to be able to remove noise having the largest phase difference. Therefore, the voice input device according to this embodiment can remove noise that enters from all directions.

4. Effects

Effects achieved by the voice input device according to this embodiment are described below.

As described above, the voice input device according to this embodiment can acquire a voice component from which noise has been removed by merely generating the differential signal that indicates the difference between the voltage signal obtained by the first microphone 10 and the voltage signal obtained by the second microphone 20. Specifically, the voice input device can implement the noise removal function without performing a complex analytical calculation process. Therefore, this embodiment can provide a voice input device that can implement a highly accurate noise removal function by a simple configuration.

The voice input device implements the noise removal function by reducing the noise intensity ratio based on the phase difference as compared with the intensity ratio of the input voice. The noise intensity ratio based on the phase difference changes corresponding to the arrangement direction of the first diaphragm 12 and the second diaphragm 22 and the noise incident direction. Specifically, the phase difference of noise increases as the distance (apparent distance) between the first diaphragm 12 and the second diaphragm 22 with respect to noise increases so that the noise intensity ratio based on the phase difference increases. In this embodiment, the voice input device is configured to be able to remove noise that enters when the apparent distance between the first diaphragm 12 and the second diaphragm 22 is a maximum, as is clear from the expression (12). Specifically, the first diaphragm 12 and the second diaphragm 22 are disposed such that noise that enters so that the noise intensity ratio based on the phase difference becomes a maximum can be removed. Therefore, the voice input device can remove noise that enters from all directions. Specifically, the invention can provide a voice input device that can remove noise that enters from all directions.

The voice input device can also remove the user's voice component that enters the voice input device after being reflected by a wall or the like. Specifically, since the user's voice reflected by a wall or the like can be considered to be produced from a sound source positioned away from the voice input device as compared with the normal user's voice. Moreover, since the energy of such a user's voice has been reduced to a large extent due to reflection, the sound pressure is not attenuated to a large extent between the first diaphragm 12 and the second diaphragm 22 in the same manner as a noise component. Therefore, the voice input device also removes the user's voice component that enters the voice input device after being reflected by a wall or the like in the same manner as noise (as one type of noise).

A signal that indicates the input voice and does not contain noise can be obtained by utilizing the voice input device. Therefore, a highly accurate voice (voice) recognition process, voice authentication process, and command generation process can be implemented by utilizing the voice input device.

When applying the voice input device to a microphone system, the user's voice output from a loudspeaker is also removed as noise. Therefore, a microphone system that rarely howls can be provided.

5. Voice Input Device According to Second Embodiment

Figure 7:
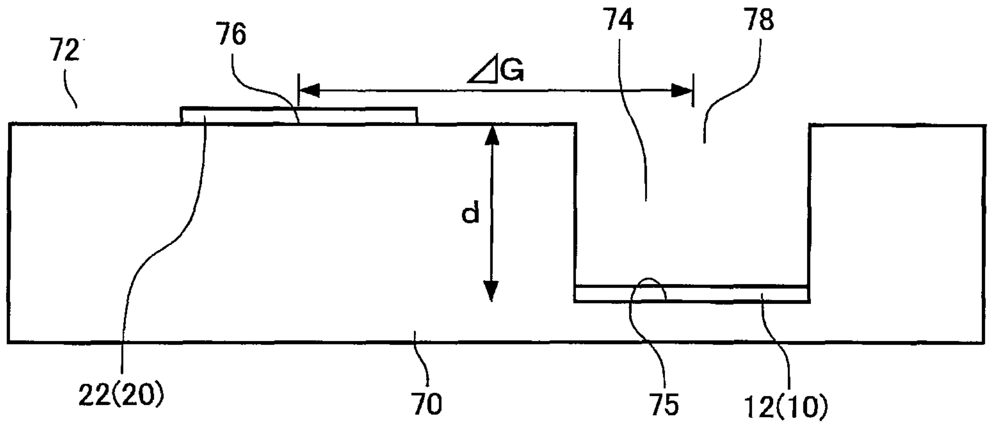
FIG. 7 illustrates a voice input device.

A voice input device according to a second embodiment to which the invention is applied is described below with reference to FIG. 7.

The voice input device according to this embodiment includes a base 70. A depression 74 is formed in a main surface 72 of the base 70. In the voice input device according to this embodiment, a first diaphragm 12 (first microphone 10) is disposed on a bottom surface 75 of the depression 74, and a second diaphragm 22 (second microphone 20) is disposed on the main surface 72 of the base 70. The depression 74 may extend perpendicularly to the main surface 72. The bottom surface 75 of the depression 74 may be parallel to the main surface 72. The bottom surface 75 may perpendicularly intersect the depression 74. The depression 74 may have the same external shape as that of the first diaphragm 12.

In this embodiment, the depression 74 may have a depth smaller than the distance between an area 76 and an opening 78. Specifically, when the depth of the depression 74 is referred to as d and the distance between the area 76 and the opening 78 is referred to as ΔG, the relationship "d≤ΔG" may be satisfied. The base 70 may satisfy the relationship "2d=ΔG". Note that the distance ΔG may be 5.2 mm or less. The base 70 may be formed so that the center-to-center distance between the first diaphragm 12 and the second diaphragm 22 is 5.2 mm or less.

The base 70 is provided so that the opening 78 that communicates with the depression 74 is disposed at a position closer to the input voice source than the area 76 of the main surface 72 in which the second diaphragm 22 is disposed. The base 70 is provided so that so that the input voice reaches the first diaphragm 12 and the second diaphragm 22 at the same time. For example, the base 70 may be disposed so that the distance between the input voice source (model sound source) and the first diaphragm 12 is equal to the distance between the model sound source and the second diaphragm 22. The base 70 may be disposed in a housing of which the basic position is set to satisfy the above-mentioned conditions.

The voice input device according to this embodiment can reduce the difference in incident time between the input voice (user's voice) incident on the first diaphragm 12 and the input voice (user's voice) incident on the second diaphragm 22. Specifically, since the differential signal can be generated so that the differential signal does not contain the phase difference component of the input voice, the amplitude component of the input voice can be accurately extracted.

Since sound waves are not diffused inside the depression 74, the amplitude of the sound waves is attenuated to only a small extent. Therefore, the intensity (amplitude) of the input voice that causes the first diaphragm 12 to vibrate is considered to be the same as the intensity of the input voice in the opening 78. Accordingly, even if the voice input device is configured so that the input voice reaches the first diaphragm 12 and the second diaphragm 22 at the same time, a difference in intensity occurs between the input voice that causes the first diaphragm 12 to vibrate and the input voice that causes the second diaphragm 22 to vibrate. As a result, the input voice can be extracted by acquiring the differential signal that indicates the difference between the first voltage signal and the second voltage signal.

In summary, the voice input device can acquire the amplitude component (differential signal) of the input voice so that noise based on the phase difference component of the input voice is excluded. This makes it possible to implement a highly accurate noise removal function.

Since the resonance frequency of the depression 74 can be set at a high value by setting the depth of the depression 74 to be equal to or less than the distance ΔG (5.2 mm), a situation in which resonance noise is generated in the depression 74 can be prevented.

Figure 8:
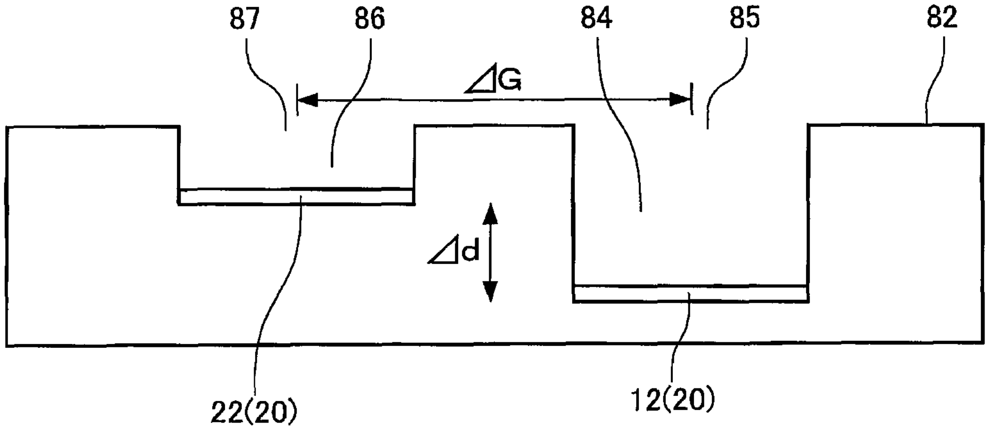
FIG. 8 illustrates a voice input device.

FIG. 8 illustrates a modification of the voice input device according to this embodiment.

The voice input device according to this embodiment includes a base 80. A first depression 84 and a second depression 86 that is shallower than the first depression 84 are formed in a main surface 82 of the base 80. A difference Δd in depth between the first depression 84 and the second depression 86 may be smaller than a distance ΔG between a first opening 85 that communicates with the first depression 84 and a second opening 87 that communicates with the second depression 86. The first diaphragm 12 is disposed on the bottom surface of the first depression 84, and the second diaphragm 22 is disposed on the bottom surface of the second depression 86.

This voice input device also achieves the above-mentioned effects and can implement a highly accurate noise removal function.

Figure 9:
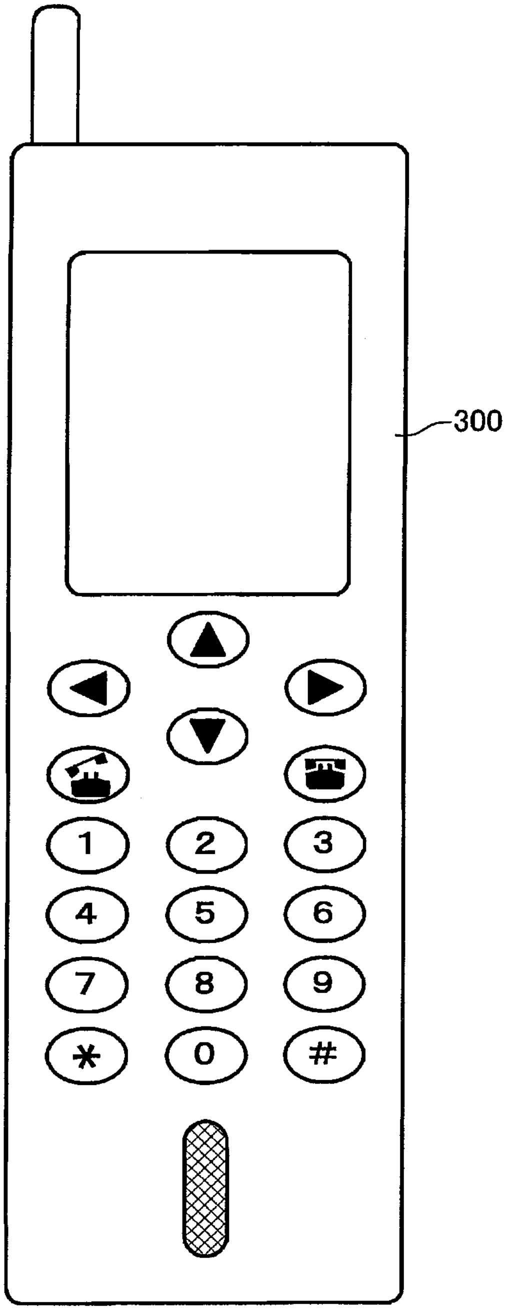
FIG. 9 illustrates a portable telephone that is an example of a voice input device.
Figure 10:
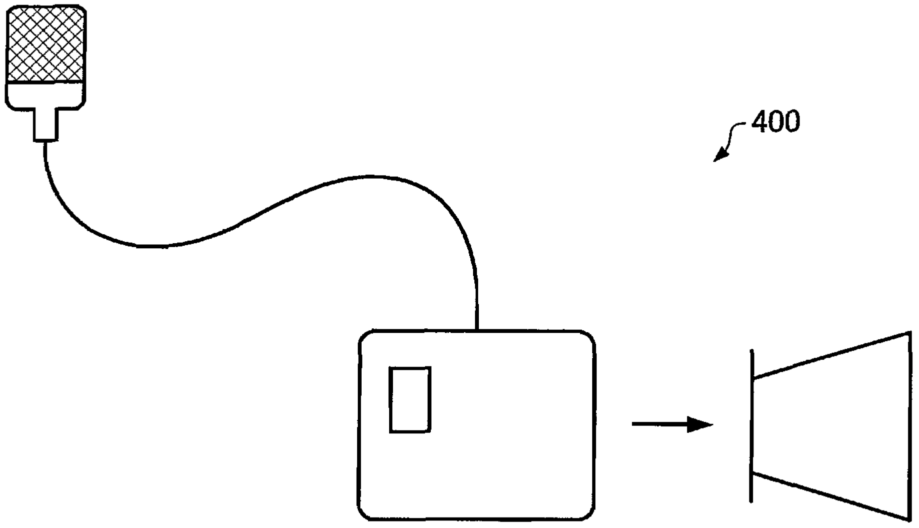
FIG. 10 illustrates a microphone that is an example of a voice input device.
Figure 11:
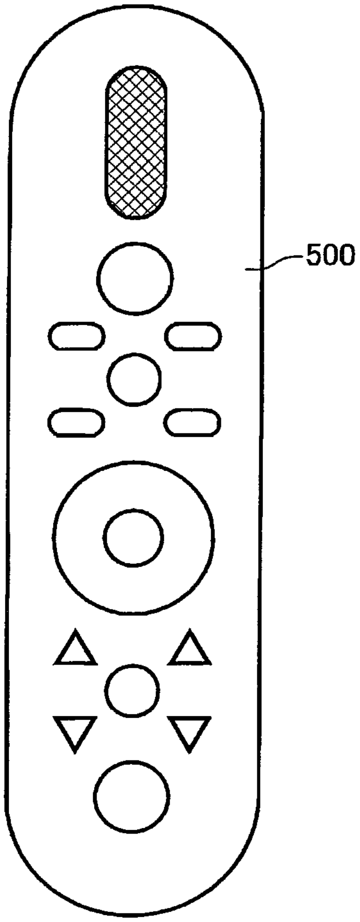
FIG. 11 illustrates a remote controller that is an example of a voice input device.
Figure 12:
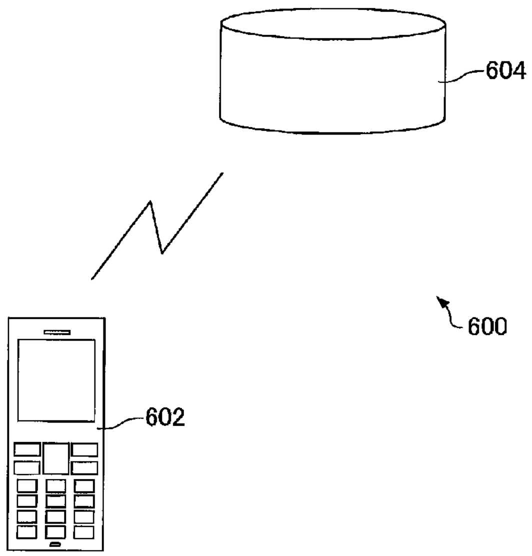
FIG. 12 schematically illustrates an information processing system.

FIGS. 9 to 11 respectively illustrate a portable telephone 300, a microphone (microphone system) 400, and a remote controller 500 as examples of the voice input device according to the embodiment of the invention. FIG. 12 schematically illustrates an information processing system 600 that includes a voice input device 602 (i.e., information input terminal) and a host computer 604.

6. Configuration of Voice Input Device According to Third Embodiment

Figure 13:
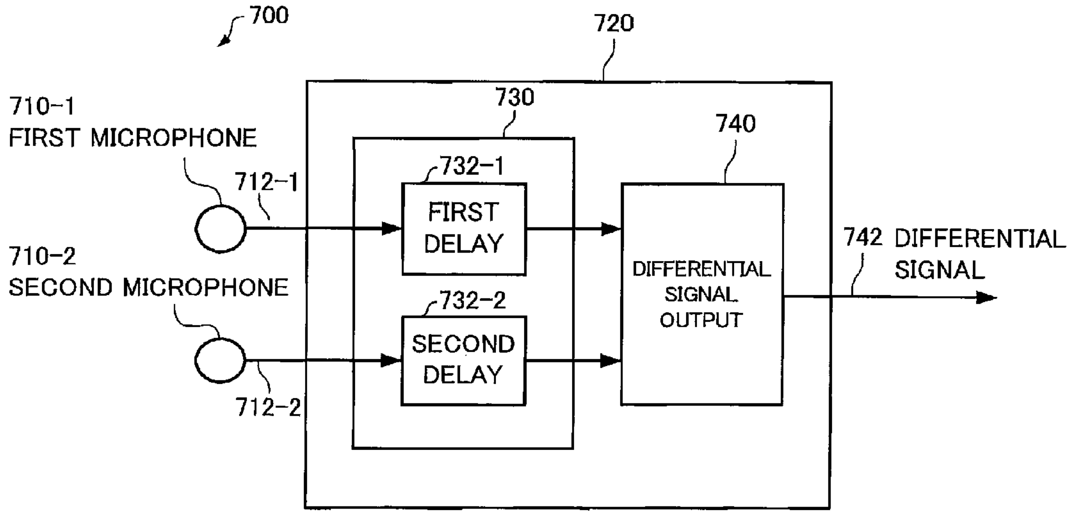
FIG. 13 illustrates an example of the configuration of a voice input device.

FIG. 13 illustrates an example of the configuration of a voice input device according to a third embodiment.

A voice input device 700 according to the third embodiment includes a first microphone 710-1 that includes a first diaphragm. The voice input device 700 according to the third embodiment also includes a second microphone 710-2 that includes a second diaphragm.

The first diaphragm of the first microphone 710-1 and the second diaphragm of the second microphone 710-2 are disposed so that a noise intensity ratio that indicates the ratio of the intensity of a noise component contained in a differential signal 742 to the intensity of the noise component contained in a first voltage signal 712-1 or a second voltage signal 712-2 is smaller than an input voice intensity ratio that indicates the ratio of the intensity of an input voice component contained in the differential signal 742 to the intensity of the input voice component contained in the first voltage signal 712-1 or the second voltage signal 712-2.

The first microphone 710-1 that includes the first diaphragm and the second microphone 710-2 that includes the second diaphragm may be configured as described with reference to FIGS. 1 to 8.

The voice input device 700 according to the third embodiment includes a differential signal generation section 720 that generates the differential signal 742 that indicates the difference between the first voltage signal 712-1 obtained by the first microphone 710-1 and the second voltage signal 712-2 obtained by the second microphone 710-2 based on the first voltage signal 712-1 and the second voltage signal 712-2.

The differential signal generation section 720 includes a delay section 730. The delay section 730 delays at least one of the first voltage signal 712-1 obtained by the first microphone 710-1 and the second voltage signal 712-2 obtained by the second microphone 710-2 by a predetermined amount, and outputs the resulting signal.

The differential signal generation section 720 includes a differential signal output section 740. The differential signal output section 740 receives the signal obtained by delaying at least one of the first voltage signal 712-1 obtained by the first microphone 710-1 and the second voltage signal 712-2 obtained by the second microphone 710-2 using the delay section 730, generates the differential signal that indicates the difference between the first voltage signal and the second voltage signal, and outputs the differential signal.

The delay section 730 may include a first delay section 732-1 that delays the first voltage signal 712-1 obtained by the first microphone 710-1 and outputs the resulting signal, or a second delay section 732-2 that delays the second voltage signal 712-2 obtained by the second microphone 710-2 and outputs the resulting signal, delay the first voltage signal 712-1 or the second voltage signal 712-2, and generate the differential signal based on the first voltage signal 712-1 and the second voltage signal 712-2 one of which has been delayed. The delay section 730 may include the first delay section 732-1 and the second delay section 732-2, delay the first voltage signal 712-1 and the second voltage signal 712-2, and generate the differential signal based on the first voltage signal 712-1 and the second voltage signal 712-2 that have been delayed. When providing both of the first delay section 732-1 and the second delay section 732-2, one of the first delay section 732-1 and the second delay section 732-2 may be configured as a delay section that delays a signal by a fixed amount, and the other of the first delay section 732-1 and the second delay section 732-2 may be configured as a delay section of which the delay amount can be adjusted.

According to this configuration, since a variation in delay of the first voltage signal and the second voltage signal due to an individual difference that occurs during microphone production can be corrected by delaying at least one of the first voltage signal 712-1 and the second voltage signal 712-2 by a predetermined amount, a decrease in noise reduction effect due to a variation in delay of the first voltage signal and the second voltage signal can be prevented.

Figure 14:
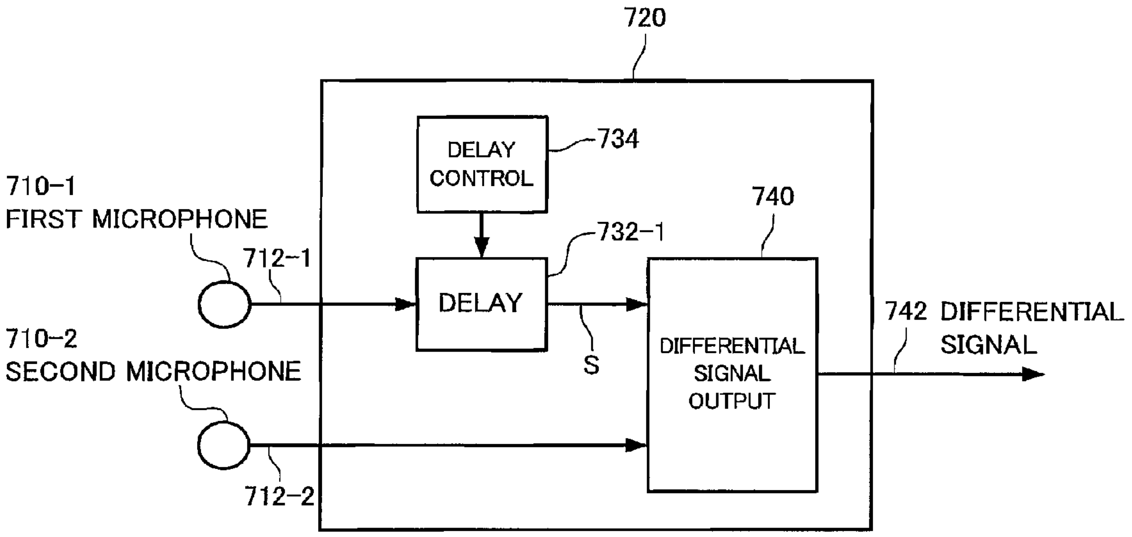
FIG. 14 illustrates an example of the configuration of a voice input device.

FIG. 14 illustrates an example of the configuration of the voice input device according to the third embodiment.

The differential signal generation section 720 according to this embodiment may include a delay control section 734. The delay control section 734 changes the delay amount of the delay section (the first delay section 732-1 in this example). The signal delay balance between an output Si from the delay section and the second voltage signal 712-2 obtained by the second microphone may be adjusted by dynamically or statically controlling the delay amount of the delay section (the first delay section 732-1 in this example) using the delay control section 734.

Figure 15:
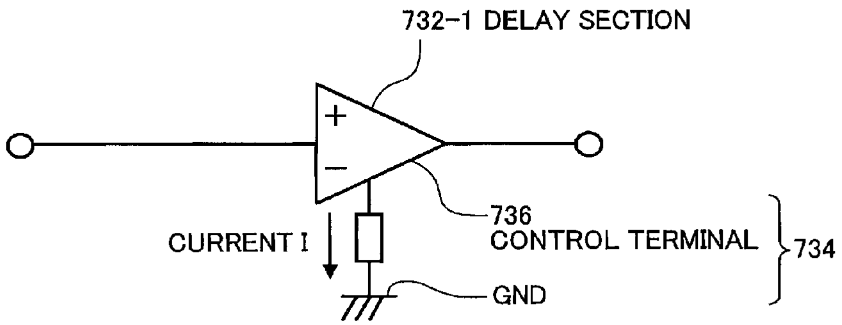
FIG. 15 illustrates an example of a configuration of a delay section and a delay control section.

FIG. 15 illustrates an example of a specific configuration of the delay section and the delay control section. The delay section (the first delay section 732-1 in this example) may be formed by an analog filter (e.g., group delay filter), for example. The delay control section 734 may dynamically or statically control the delay amount of a group delay filter 732-1 by controlling the voltage between a control terminal 736 of the group delay filter 732-1 and GND, or the amount of current that flows between the control terminal 736 and GND, for example.

Figure 16A:
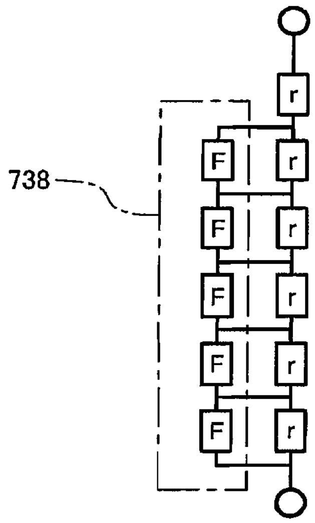
FIG. 16A illustrates an example of a configuration that statically controls the delay amount of a group delay filter.
Figure 16B:
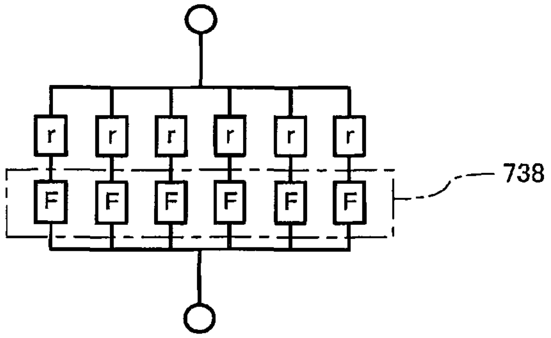
FIG. 16B illustrates an example of a configuration that statically controls the delay amount of a group delay filter.

FIGS. 16A and 16B respectively illustrate an example of a configuration that statically controls the delay amount of the group delay filter.

As illustrated in FIG. 16A, the delay control section 734 may include a resistor array in which a plurality of resistors (r) are connected in series, and supply a predetermined amount of current to a predetermined terminal (control terminal 734 in FIG. 15) of the delay section through the resistor array, for example. The resistors (r) or conductors (F indicated by reference numeral 738) that form the resistor array may be cut using a laser or fused by applying a high voltage or a high current during the production process corresponding to a predetermined amount of current.

As illustrated in FIG. 16B, the delay control section 734 may include a resistor array in which a plurality of resistors (r) are connected in parallel, and supply a predetermined amount of current to a predetermined terminal (control terminal 734 in FIG. 15) of the delay section through the resistor array. The resistors (r) or conductors (F) that form the resistor array may be cut using a laser or fused by applying a high voltage or a high current during the production process corresponding to a predetermined amount of current.

A current supplied to the predetermined terminal of the delay section may be set at a value that can cancel a variation in delay that has occurred during the production process. A resistance corresponding to a variation in delay that has occurred during the production process can be achieved by utilizing the resistor array in which a plurality of resistors (r) are connected in series or parallel (see FIGS. 16A and 16B), so that the delay control section that is connected to the predetermined terminal supplies a current that controls the delay amount of the delay section.

This embodiment has been described taking an example in which a plurality of resistors (r) are connected through fuses (F). Note that the invention is not limited thereto. A plurality of resistors (r) may be connected in series or parallel without using the fuses (F). In this case, at least one resistor may be cut.

Figure 32:
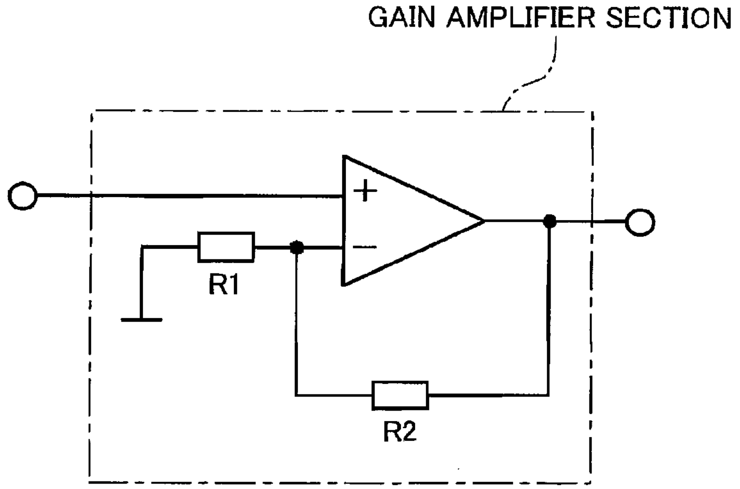
FIG. 32 illustrates an example of a configuration of a gain section and a gain control section.
Figure 40:
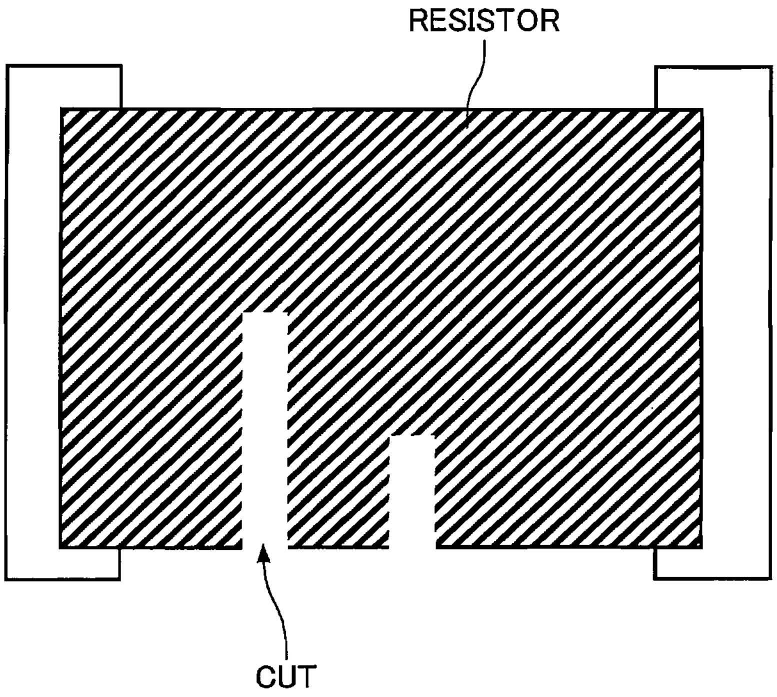
FIG. 40 illustrates an example of adjustment of a resistance by laser trimming.

Alternatively, a resistor R1 or R2 in FIG. 32 may be formed by a single resistor (see FIG. 40), and the resistance of the resistor may be adjusted by cutting part of the resistor (i.e., laser trimming).

Figure 17:
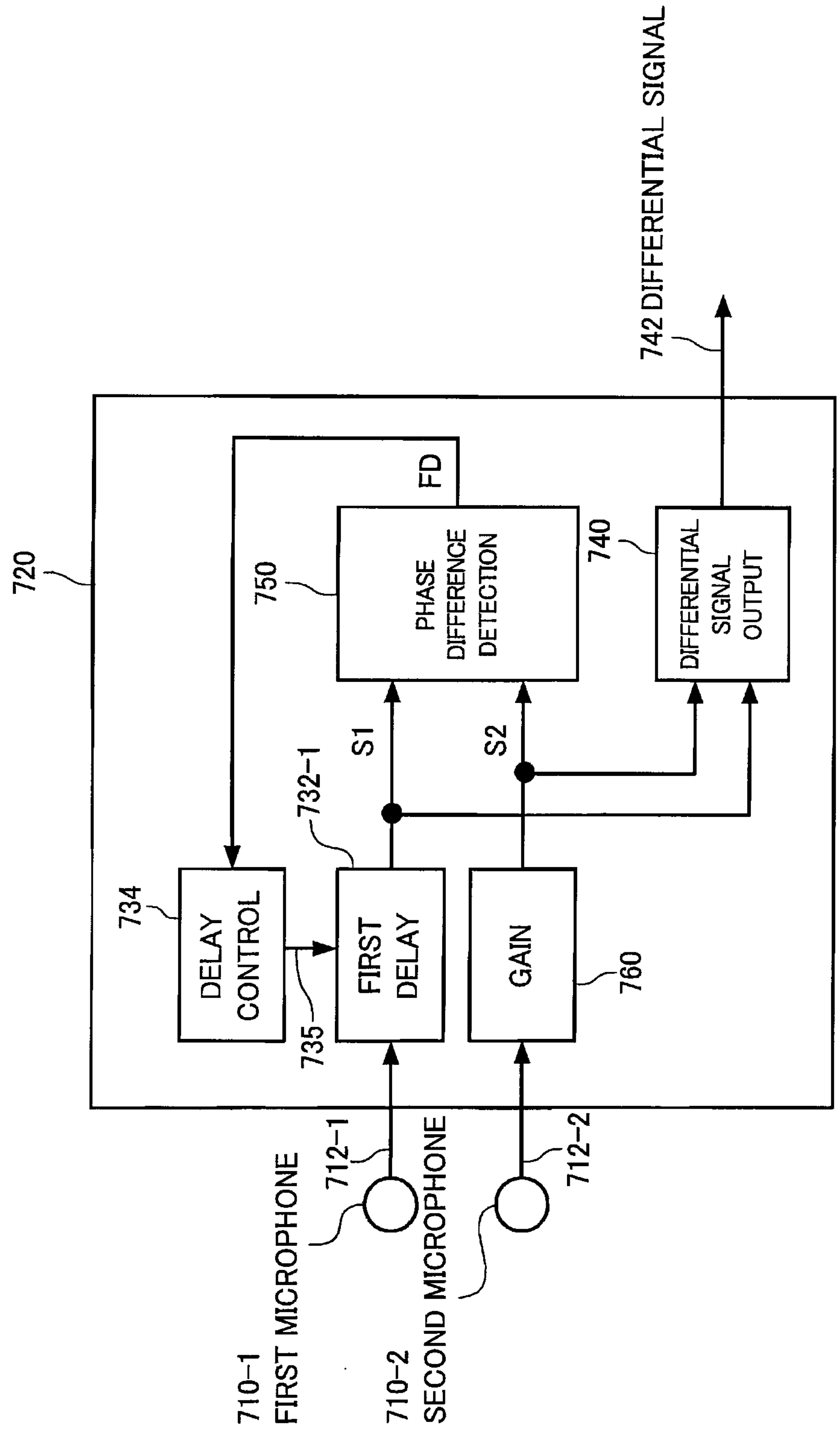
FIG. 17 illustrates an example of the configuration of a voice input device.

FIG. 17 illustrates an example of the configuration of the voice input device according to the third embodiment.

The differential signal generation section 720 may include a phase difference detection section 750. The phase difference detection section 750 receives a first voltage signal (S1) and a second voltage signal (S2) input to the differential signal output section 740, detects the difference in phase between the first voltage signal (S1) and the second voltage signal (S2) when the differential signal 742 is generated based on the first voltage signal (S1) and the second voltage signal (S2), generates a phase difference signal (FD) based on the detection result, and outputs the phase difference signal (FD).

The delay control section 734 may change the delay amount of the delay section (the first delay section 732-1 in this example) based on the phase difference signal (FD).

The differential signal generation section 720 may include a gain section 760. The gain section 760 applies a predetermined gain to at least one of the first voltage signal obtained by the first microphone 710-1 and the second voltage signal obtained by the second microphone 710-2, and outputs the resulting signal.

The differential signal output section 740 may receive the signal (S2) obtained by applying a gain to at least one of the first voltage signal obtained by the first microphone 710-1 and the second voltage signal obtained by the second microphone 710-2 using the gain section 760, generate the differential signal that indicates the difference between the first voltage signal (S1) and the second voltage signal (S2), and output the differential signal.

For example, the phase difference detection section 740 may calculate the phase difference between the output S1 from the delay section (the first delay section 732-1 in this example) and the output S2 from the gain section and output the phase difference signal FD, and the delay control section 734 may dynamically change the delay amount of the delay section (the first delay section 732-1 in this example) corresponding to the polarity of the phase difference signal FD.

The first delay section 732-1 receives the first voltage signal 712-1 obtained by the first microphone 710-1, delays the first voltage signal 712-1 by a predetermined amount based on a delay control signal (e.g., a predetermined current) 735, and outputs the resulting voltage signal S1. The gain section 760 receives the second voltage signal 712-2 obtained by the second microphone 710-1, amplifies the second voltage signal 712-2 by a predetermined gain, and outputs the resulting voltage signal S2. The phase difference signal output section 754 receives the voltage signal S1 output from the first delay section 732-1 and the voltage signal S2 output from the gain section 760, and outputs the phase difference signal FD. The delay control section 734 receives the phase difference signal FD output from the phase difference signal output section 754, and outputs the delay control signal (e.g., a predetermined current) 735. The delay amount of the first delay section 732-1 may be feedback-controlled by controlling the delay amount of the first delay section 732-1 based on the delay control signal (e.g., a predetermined current) 735.

Figure 18:
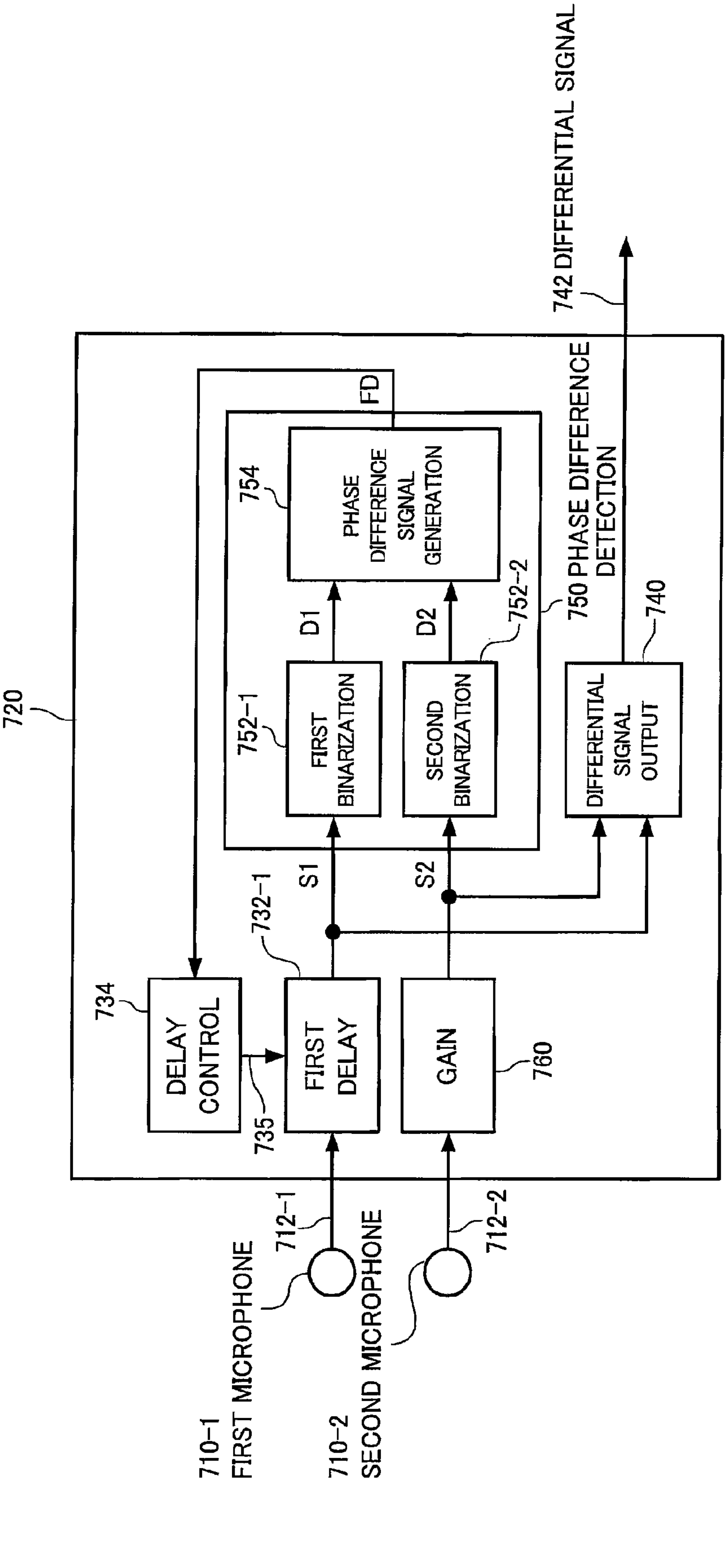
FIG. 18 illustrates an example of the configuration of a voice input device.

FIG. 18 illustrates another example of the configuration of the voice input device according to the third embodiment.

As illustrated in FIG. 18, the phase difference detection section 720 may include a first binarization section 752-1. The first binarization section 752-1 binarizes the received first voltage signal S1 at a predetermined level to convert the first voltage signal S1 into a first digital signal D1.

The phase difference detection section 720 may also include a second binarization section 752-2. The second binarization section 752-2 binarizes the received second voltage signal S2 at a predetermined level to convert the second voltage signal S2 into a second digital signal D2.

The phase difference detection section 720 includes the phase difference signal output section 754. The phase difference signal output section 754 calculates the phase difference between the first digital signal D1 and the second digital signal D2, and outputs the phase difference signal FD.

The first delay section 732-1 receives the first voltage signal 712-1 obtained by the first microphone 710-1, delays the first voltage signal 712-1 by a predetermined amount based on the delay control signal (e.g., a predetermined current) 735, and outputs the resulting signal S1. The gain section 760 receives the second voltage signal 712-2 obtained by the second microphone 710-1, amplifies the second voltage signal 712-2 by a predetermined gain, and outputs the resulting signal S2. The first binarization section 752-1 receives the first voltage signal S1 output from the first delay section 732-1, and outputs the first digital signal D1 that has been binarized at a predetermined level. The second binarization section 752-2 receives the second voltage signal S2 output from the gain section 760, and outputs the second digital signal D2 that has been binarized at a predetermined level. The phase difference signal output section 754 receives the first digital signal D1 output from the first binarization section 752-1 and the second digital signal D2 output from the second binarization section 752-2, and outputs the phase difference signal FD. The delay control section 734 receives the phase difference signal FD output from the phase difference signal output section 754, and outputs the delay control signal (e.g., a predetermined current) 735. The delay amount of the first delay section 732-1 may be feedback-controlled by controlling the delay amount of the first delay section 732-1 based on the delay control signal (e.g., a predetermined current) 735.

Figure 19:
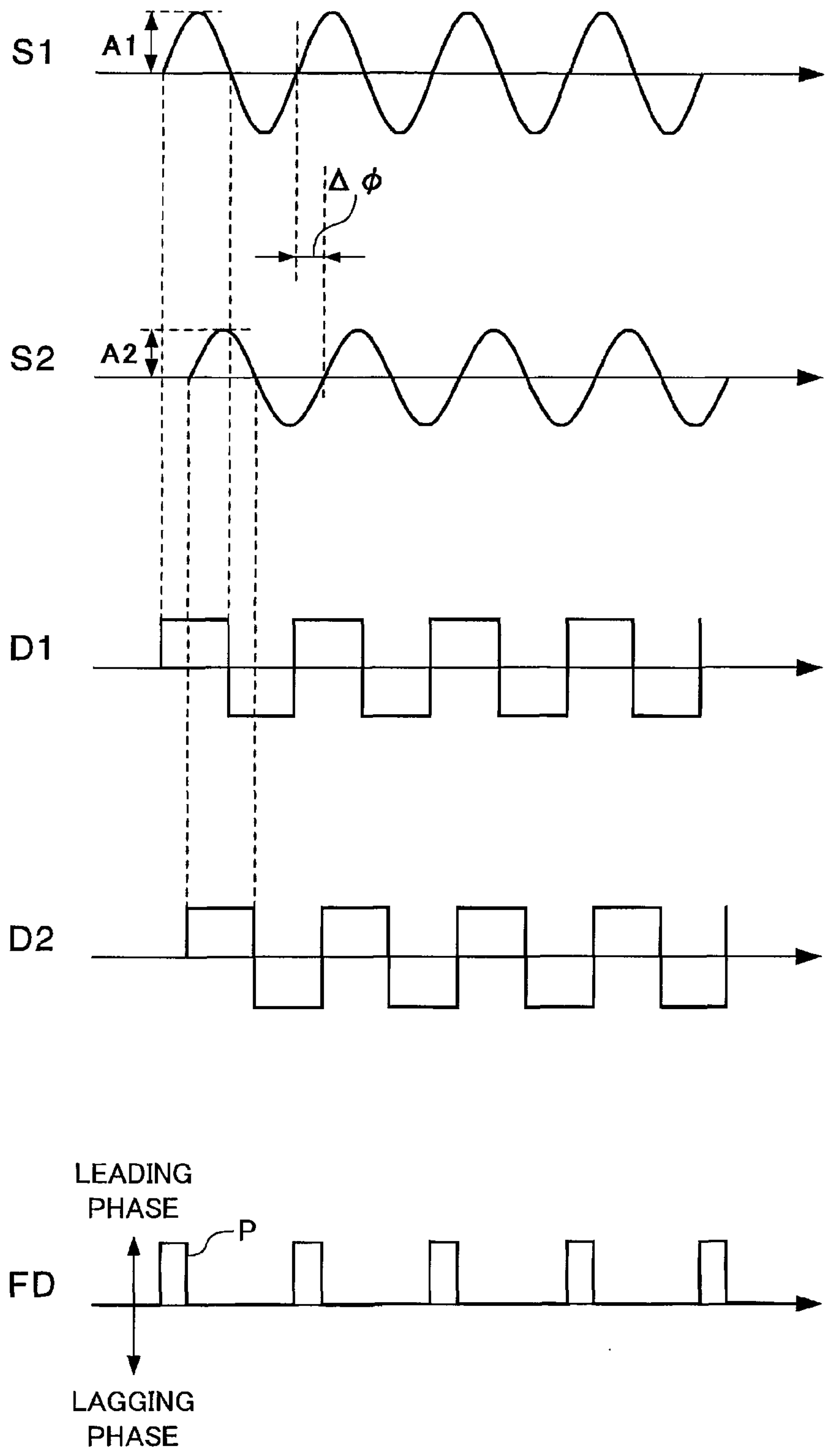
FIG. 19 is a timing chart of a phase difference detection section.

FIG. 19 is a timing chart of the phase difference detection section. S1 indicates the voltage signal output from the first delay section 732-1, and S2 indicates the voltage signal output from the gain section. In FIG. 19, the phase of the voltage signal S2 is delayed by $\Delta\phi$ as compared with the phase of the voltage signal S1.

D1 indicates the binarized signal of the voltage signal S1, and D2 indicates the binarized signal of the voltage signal S2. For example, the signal D1 or D2 is obtained by causing the voltage signal S1 or S2 to pass through a high-pass filter, and binarizing the resulting signal using a comparator circuit.

FD indicates the phase difference signal generated based on the binarized signal D1 and the binarized signal D2. As illustrated in FIG. 19, when the phase of the first voltage signal leads the phase of the second voltage signal, a positive pulse P having a pulse width corresponding to the phase difference may be generated in each cycle, for example. When the phase of the first voltage signal lags behind the phase of the second voltage signal, a negative pulse having a pulse width corresponding to the phase difference may be generated in each cycle, for example.

Figure 21:
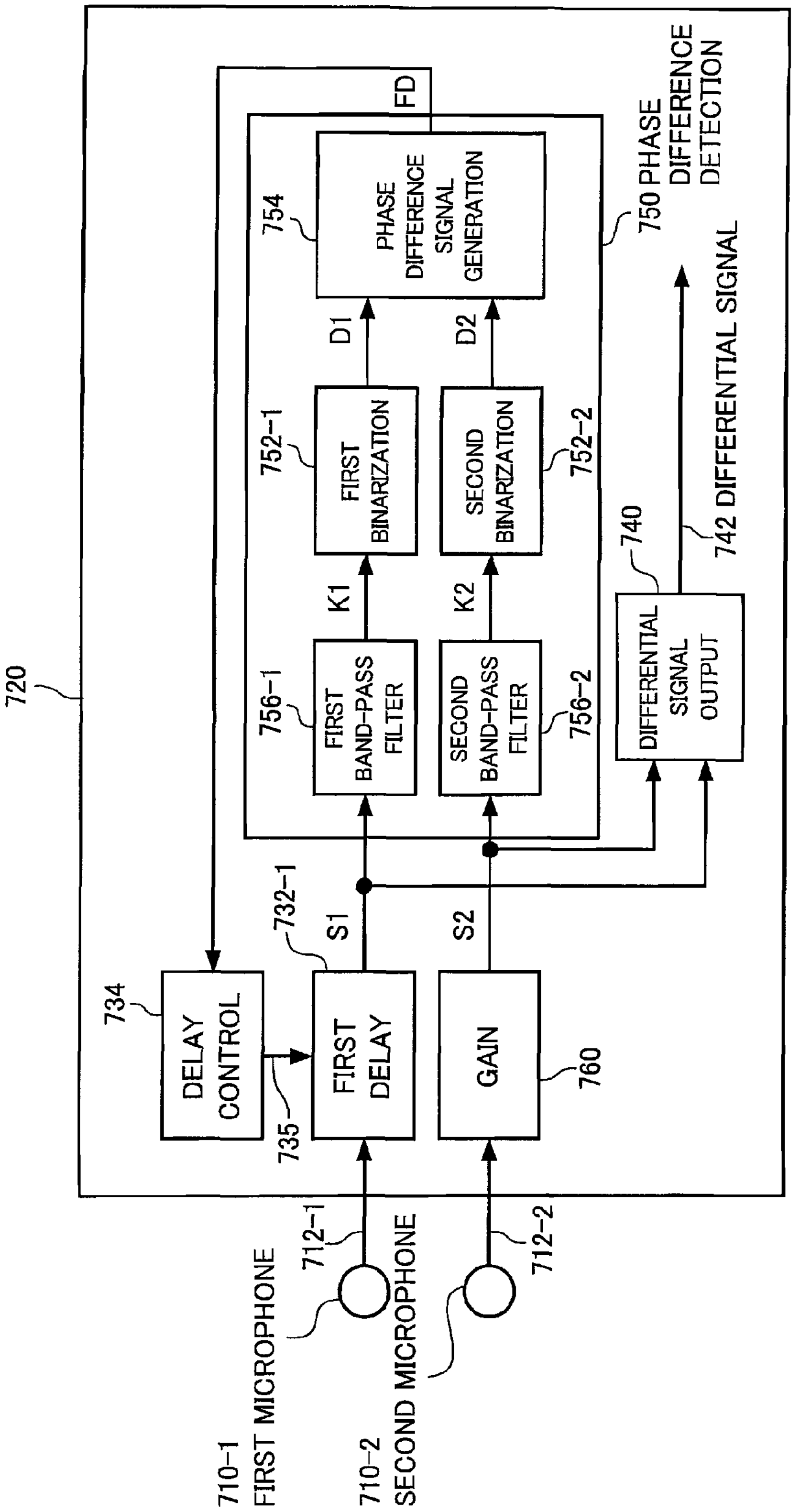
FIG. 21 illustrates an example of the configuration of a voice input device.

FIG. 21 illustrates yet another example of the configuration of the voice input device according to the third embodiment.

As illustrated in FIG. 21, the phase difference detection section 750 includes a first band-pass filter 756-1. The first band-pass filter 756-1 receives the first voltage signal S1, and allows a signal K1 having a predetermined single frequency to pass through.

The phase difference detection section 750 also includes a second band-pass filter 756-2. The second band-pass filter 756-2 receives the second voltage signal S2, and allows a signal K2 having a predetermined single frequency to pass through.

The phase difference detection section 750 may detect the phase difference based on the first voltage signal K1 and the second voltage signal K2 that have passed through the first band-pass filter 756-1 and the second band-pass filter 756-2.

Figure 20:
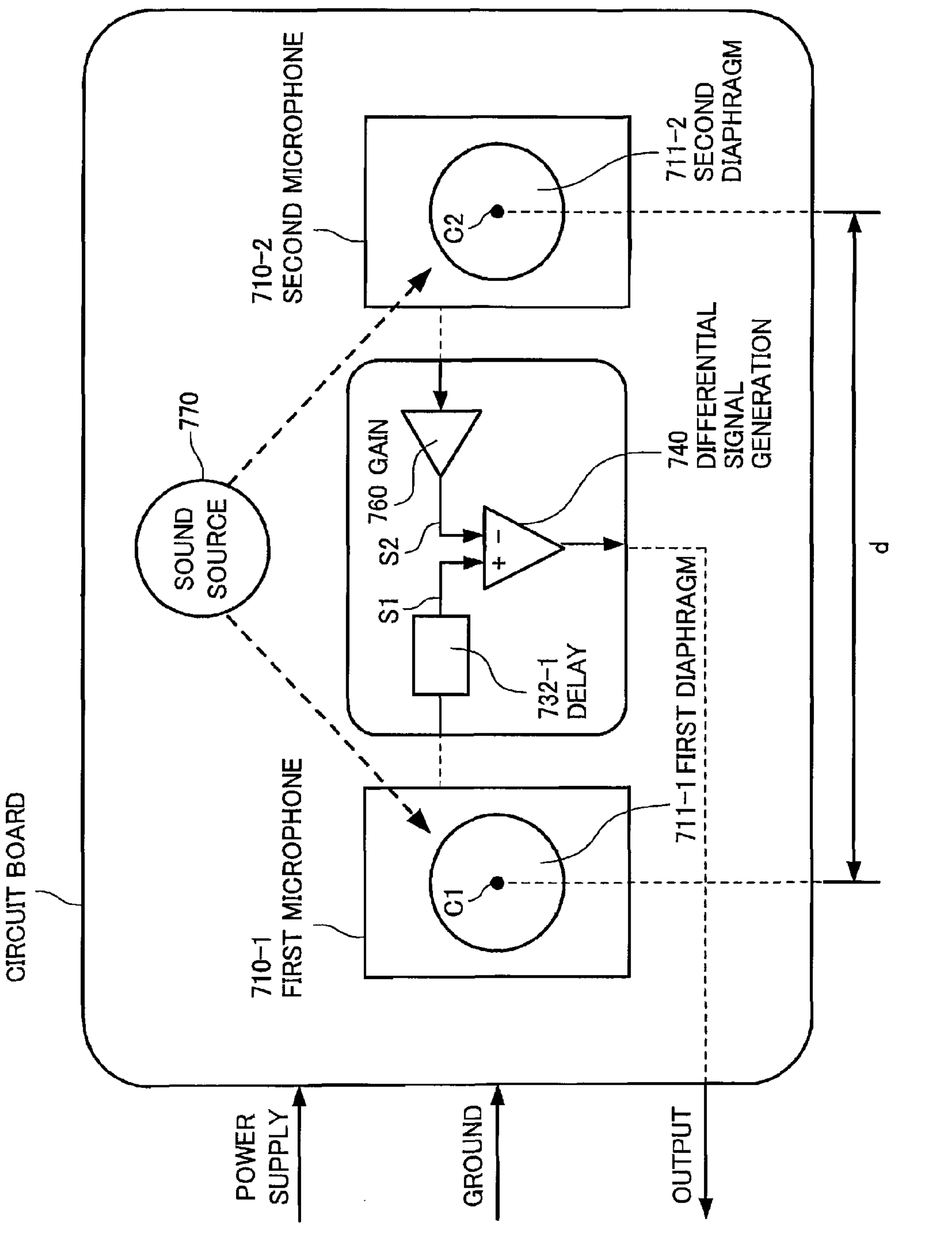
FIG. 20 illustrates an example of the configuration of a voice input device.

As illustrated in FIG. 20, a sound source section 770 is disposed at an equal distance from the first microphone 710-1 and the second microphone 710-2, for example. The first microphone 710-1 and the second microphone 710-2 receives sound having a single frequency that is generated by the sound source section 770. The sound having a frequency other than the single frequency is cut off by the first band-pass filter 756-1 and the second band-pass filter 756-2, and the phase difference is then detected. In this case, the SN ratio of the phase comparison signal can be improved so that the phase difference or the delay amount can be detected with high accuracy.

When the voice input device does not include the sound source section 770, a test sound source may be temporarily provided near the voice input device during a test, and may be set so that sound is input to the first microphone and the second microphone with the same phase. The first microphone and the second microphone may receive sound generated by the test sound source, and the waveforms of the first voltage signal and the second voltage signal may be monitored. The delay amount of the delay section may be changed so that the phase of the first voltage signal coincides with the phase of the second voltage signal.

The first delay section 732-1 receives the first voltage signal 712-1 obtained by the first microphone 710-1, delays the first voltage signal 712-1 by a predetermined amount based on the delay control signal (e.g., a predetermined current) 735, and outputs the resulting signal S1. The gain section 760 receives the second voltage signal 712-2 obtained by the second microphone 710-1, amplifies the second voltage signal 712-2 by a predetermined gain, and outputs the resulting signal S2. The first band-pass filter 756-1 receives the first voltage signal S1 output from the first delay section 732-1, and outputs the signal K1 having a single frequency. The second band-pass filter 756-2 receives the second voltage signal S2 output from the gain section 760, and outputs the signal K2 having a single frequency. The first binarization section 752-1 receives the signal K1 having a single frequency output from the first band-pass filter 756-1, and outputs the first digital signal D1 that has been binarized at a predetermined level. The second binarization section 752-2 receives the signal K2 having a single frequency output from the second band-pass filter 756-2, and outputs the second digital signal D2 that has been binarized at a predetermined level. The phase difference signal output section 754 receives the first digital signal D1 output from the first binarization section 752-1 and the second digital signal D2 output from the second binarization section 752-2, and outputs the phase difference signal FD. The delay control section 734 receives the phase difference signal FD output from the phase difference signal output section 754, and outputs the delay control signal (e.g., a predetermined current) 735. The delay amount of the first delay section 732-1 may be feedback-controlled by controlling the delay amount of the first delay section 732-1 based on the delay control signal (e.g., a predetermined current) 735.

Figure 22A:
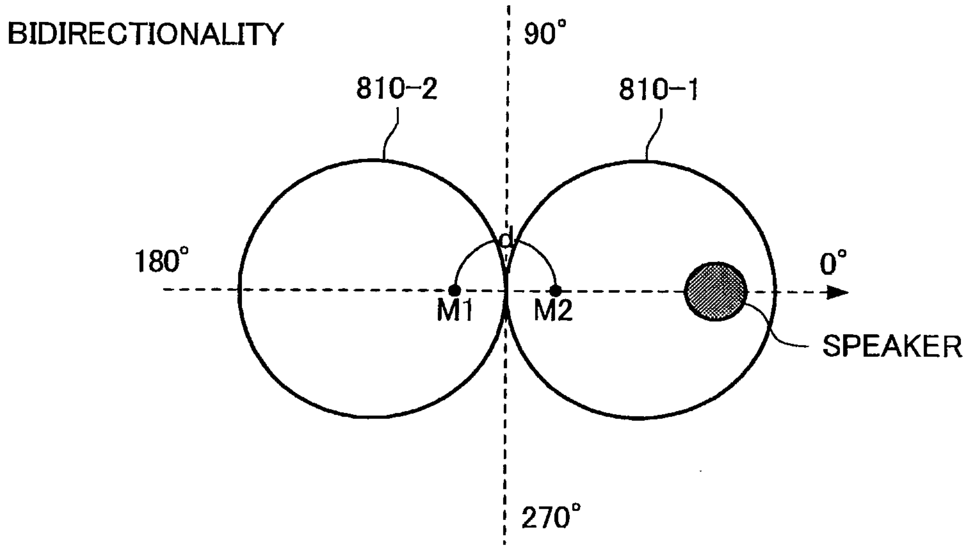
FIG. 22A illustrates the directivity of a differential microphone.
Figure 22B:
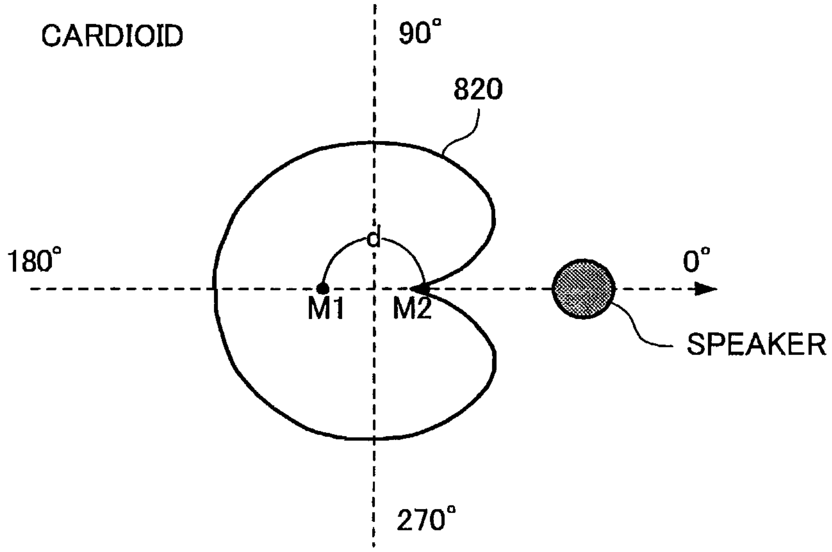
FIG. 22B illustrates the directivity of a differential microphone.

FIGS. 22A and 22B respectively illustrate the directivity of a differential microphone.

FIG. 22A illustrates the directional pattern in state in which the phases of two microphones M1 and M2 coincide. Circular areas 810-1 and 810-2 indicate the directional pattern obtained by the difference in output between the microphones M1 and M2. When the direction of a straight line that connects the microphones M1 and M2 indicates 0° and 180° and the direction that perpendicularly intersects the straight line that connects the microphones M1 and M2 indicates 90° and 270°, FIG. 22A illustrates bidirectionality in which the differential microphone has the maximum sensitivity in the directions of 0° and 180° and does not have sensitivity in the directions of 90° and 270°.

When one of the signals obtained by the microphones M1 and M2 is delayed, the directional pattern changes. For example, when the output from the microphone M1 is delayed by an amount corresponding to a value (time) obtained by dividing a microphone distance d by a speed of sound c, the directivity of the microphones M1 and M2 is indicated by a cardioid area (see 820 in FIG. 22B). In this case, a directional pattern in which the differential microphone has no sensitivity (null) to a speaker positioned at 0° can be implemented so that only surrounding sound (surrounding noise) can be acquired by selectively cutting off the speaker's voice.

The surrounding noise level can be detected by utilizing the above-mentioned characteristics.

Figure 23:
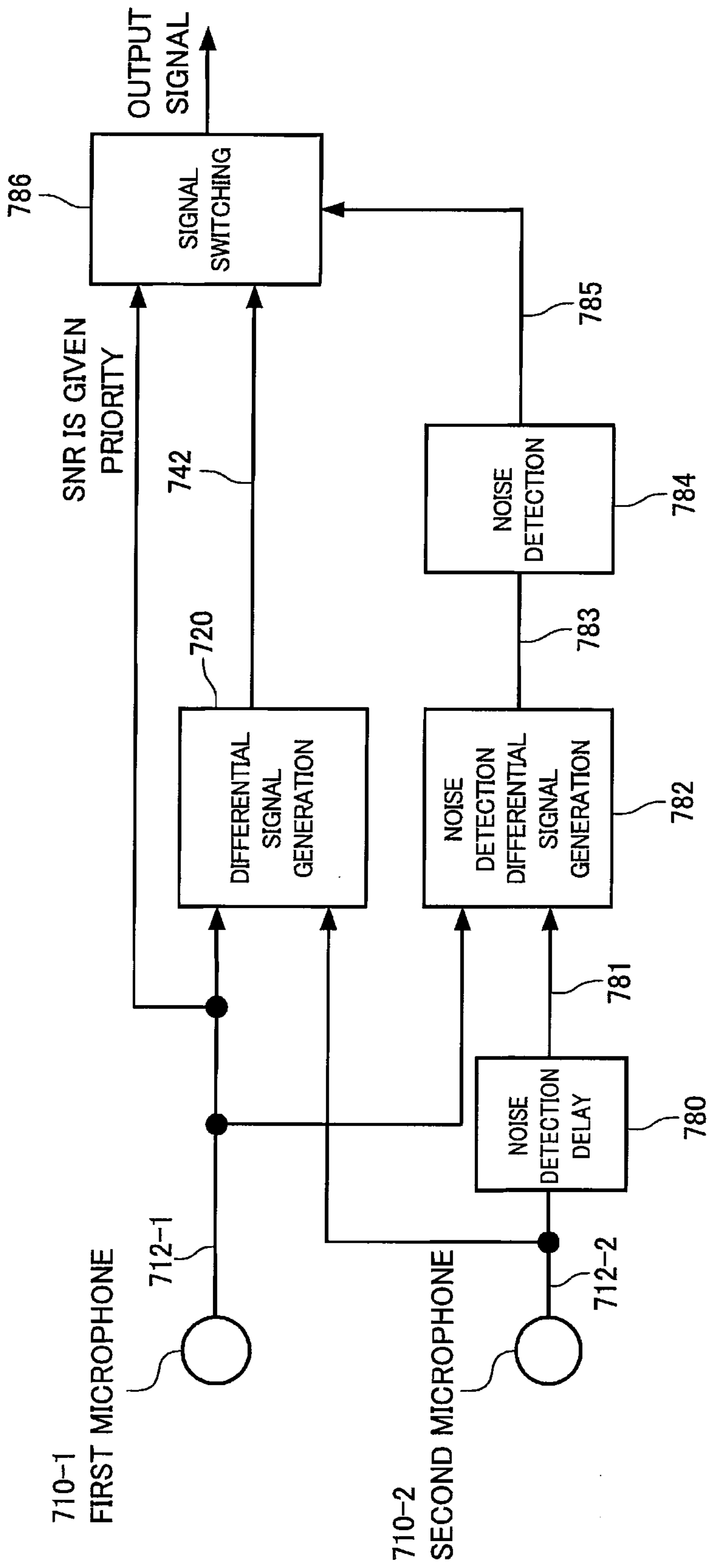
FIG. 23 illustrates an example of the configuration of a voice input device that includes a noise detection means.

FIG. 23 illustrates an example of the configuration of a voice input device that includes a noise detection means.

The voice input device according to this embodiment includes a noise detection delay section 780. The noise detection delay section 780 delays the second voltage signal 712-2 obtained by the second microphone 710-2 by a noise detection delay amount.

The voice input device according to this embodiment includes a noise detection differential signal generation section 782. The noise detection differential signal generation section 782 generates a noise detection differential signal 783 that indicates the difference between a signal 781 that has been delayed by the noise detection delay section 780 by a predetermined noise detection delay amount and the first voltage signal 712-1 obtained by the first microphone 710-1.

The voice input device according to this embodiment includes a noise detection section 784. The noise detection section 784 determines the noise level based on the noise detection differential signal 783, and outputs a noise detection signal 785 based on the determination result. The noise detection section 784 may calculate the average level of the noise detection differential signal, and generate the noise detection differential signal 785 based on the average level.

The voice input device according to this embodiment includes a signal switching section 786. The signal switching section 786 receives the differential signal 742 output from the differential signal generation section 720 and the first voltage signal 712-1 obtained by the first microphone, and selectively outputs the first voltage signal 712-1 or the differential signal 742 based on the noise detection signal 785. The signal switching section 786 may output the first voltage signal obtained by the first microphone when the noise level is equal to or lower than a predetermined level, and may output the differential signal when the average level is higher than a predetermined level. Therefore, sound acquired by a single microphone having a good signal-to-noise ratio (SN ratio (SNR)) is output in a quiet environment (i.e., the noise level is equal to or lower than a predetermined level). On the other hand, sound acquired by a differential microphone having an excellent noise removal performance is output in a noisy environment (i.e., the noise level is equal to or higher than a predetermined level).

The differential signal generation section may have the configuration described with reference to FIGS. 13, 14, 17, 18, and 21, or may have the configuration of a normal differential microphone. The first diaphragm of the first microphone 710-1 and the second diaphragm of the second microphone 710-1 may or may not be disposed so that the noise intensity ratio that indicates the ratio of the intensity of a noise component contained in the differential signal 742 to the intensity of the noise component contained in the first voltage signal or the second voltage signal is smaller than the input voice intensity ratio that indicates the ratio of the intensity of an input voice component contained in the differential signal to the intensity of the input voice component contained in the first voltage signal or the second voltage signal.

The noise detection delay amount may not be a value (time) obtained by dividing the center-to-center distance (d in FIG. 20) between the first diaphragm and the second diaphragm by the speed of sound. Even if the speaker is not positioned in the 0° direction, it is possible to implement characteristics that are suitable for noise detection and have a directivity that collects surrounding noise while cutting off the speaker's voice by setting the null (no sensitivity) direction of the directional pattern in the direction of the speaker. For example, the delay amount may be set so that a cardioid or super-cardioid directional pattern is implemented to cut off the speaker's voice.

The differential signal generation section 720 receives the first voltage signal 712-1 obtained by the first microphone 710-1 and the second voltage signal 712-2 obtained by the second microphone 710-2, and generates and outputs the differential signal 742.

The noise detection delay section 780 receives the second voltage signal 712-2 obtained by the second microphone 710-2, delays the second voltage signal 712-2 by a noise detection delay amount, and outputs the resulting signal 781. The noise detection differential signal generation section 782 generates the noise detection differential signal 783 that indicates the difference between a signal 781 that has been delayed by the noise detection delay section 780 by a predetermined noise detection delay amount and the first voltage signal 712-1 obtained by the first microphone 710-1, and outputs the noise detection differential signal 783. The noise detection section 784 receives the noise detection differential signal 783, determines the noise level based on the noise detection differential signal 783, and outputs the noise detection signal 785 based on the determination result.

The signal switching section 786 receives the differential signal 742 output from the differential signal generation section 720, the first voltage signal 712-1 obtained by the first microphone, and the noise detection signal 785, and selectively outputs the first voltage signal 712-1 or the differential signal 742 based on the noise detection signal 785.

Figure 24:
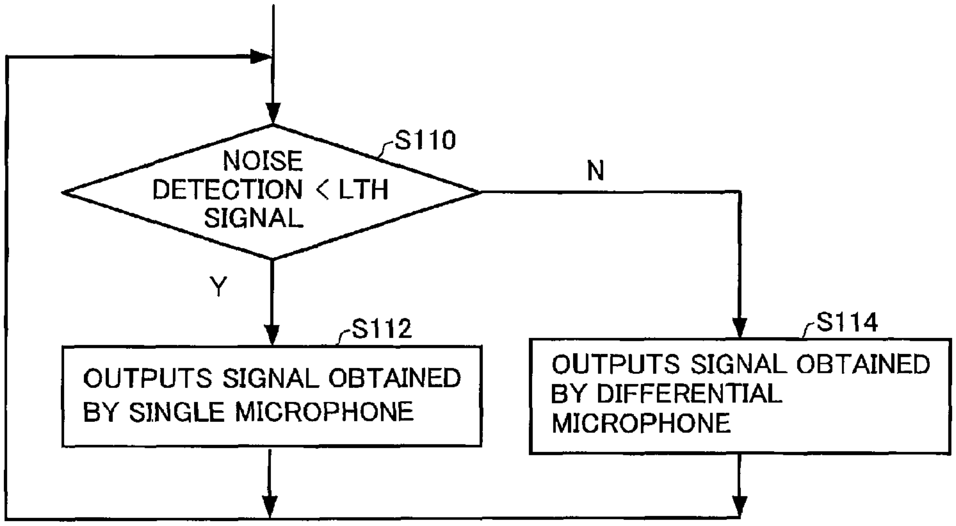
FIG. 24 is a flowchart illustrating a signal switching operation example based on noise detection.

FIG. 24 is a flowchart illustrating a signal switching operation example based on noise detection.

When the noise detection signal output from the noise detection section is smaller than a predetermined threshold value (LTH) (step S110), the signal switching section outputs the signal obtained by the single microphone (step S112). When the noise detection signal output from the noise detection section is larger than the predetermined threshold value (LTH) (step S110), the signal switching section outputs the signal obtained by the differential microphone (step S114).

When the voice input device includes a loudspeaker that outputs sound information, the voice input device may include a volume control section that controls the volume of the loudspeaker based on the noise detection signal.

Figure 25:
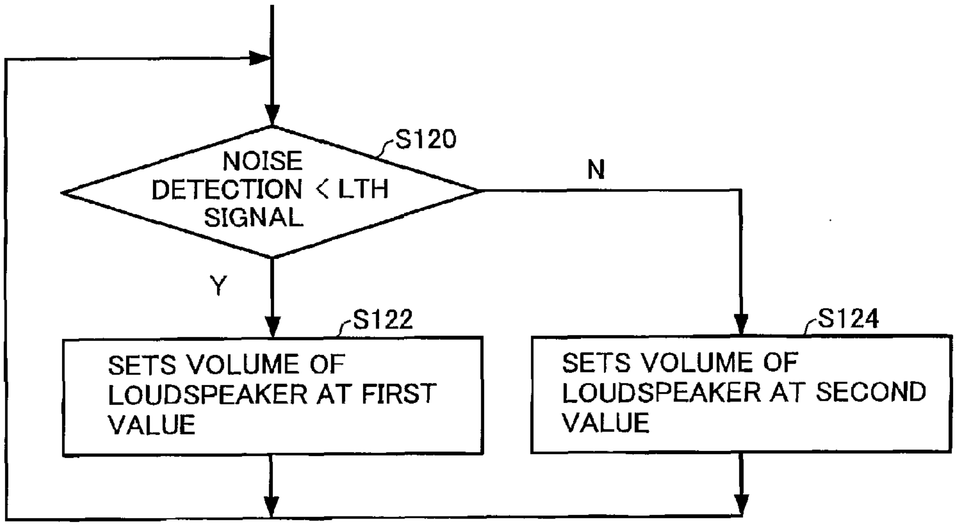
FIG. 25 is a flowchart illustrating a loudspeaker volume control operation example based on noise detection.

FIG. 25 is a flowchart illustrating a loudspeaker volume control operation example based on noise detection.

When the noise detection signal output from the noise detection section is smaller than the predetermined threshold value (LTH) (step S120), the volume of the loudspeaker is set at a first value (step S122). When the noise detection signal output from the noise detection section is larger than the predetermined threshold value (LTH) (step S120), the volume of the loudspeaker is set at a second value larger than the first value (step S124).

The volume of the loudspeaker may be turned down when the noise detection signal output from the noise detection section is smaller than the predetermined threshold value (LTH), and may be turned up when the noise detection signal output from the noise detection section is larger than the predetermined threshold value (LTH).

Figure 26:
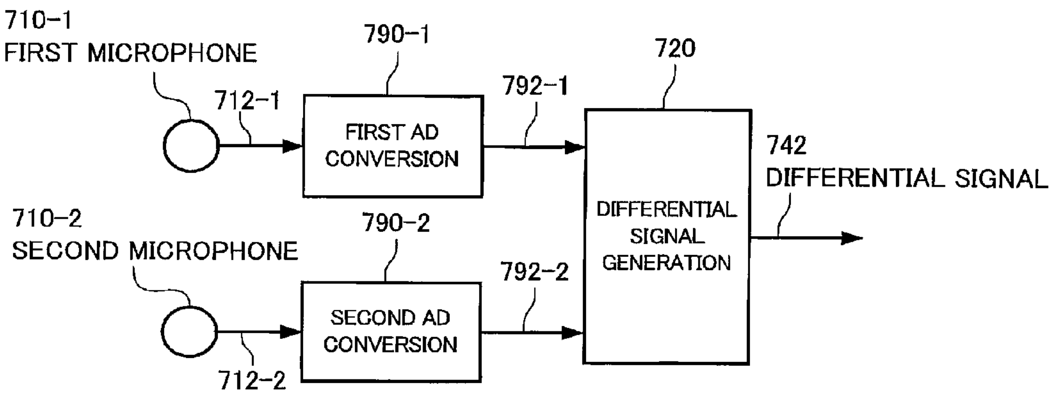
FIG. 26 illustrates an example of the configuration of a voice input device that includes an AD conversion means.

FIG. 26 illustrates an example of the configuration of a voice input device that includes an AD conversion means.

The voice input device according to this embodiment may include a first AD conversion means 790-1. The first AD conversion means 790-1 subjects the first voltage signal 712-1 obtained by the first microphone 710-1 to analog-to-digital conversion.

The voice input device according to this embodiment may include a second AD conversion means 790-2. The second AD conversion means 790-2 subjects the second voltage signal 712-2 obtained by the second microphone 710-2 to analog-to-digital conversion.

The voice input device according to this embodiment includes the differential signal generation section 720. The differential signal generation section 720 may generate the differential signal 742 that indicates the difference between a first voltage signal 782-1 that has been converted into a digital signal by the first AD conversion means 790-1 and a second voltage signal 782-2 that has been converted into a digital signal by the second AD conversion means 790-2 based on the first voltage signal 782-1 and the second voltage signal 782-2.

The differential signal generation section 720 may have the configuration described with reference to FIGS. 13, 14, 17, 18, and 21. The delay amount of the differential signal generation section 720 may be set to be an integral multiple of the analog-to-digital conversion cycle of the first AD conversion means 790-1 and the second AD conversion means 790-2. In this case, the delay section can delay the signal by digitally shifting the input signal by one or more clock pulses using a flip-flop.

The center-to-center distance between the first diaphragm of the first microphone 710-1 and the second diaphragm of the second microphone 710-2 may be set to be a value obtained by multiplying the analog-to-digital conversion cycle by the speed of sound or an integral multiple of that value.

In this case, the noise detection delay section can accurately implement a directional pattern (e.g., cardioid directional pattern) convenient for collecting surrounding noise by a simple operation that shifts the input voltage signal by n clock pulses (n is an integer).

For example, when the sampling frequency when performing analog-to-digital conversion is 44.1 kHz, the center-to-center distance between the first diaphragm and the second diaphragm is about 7.7 mm. When the sampling frequency is 16 kHz, the center-to-center distance between the first diaphragm and the second diaphragm is about 21 mm.

Figure 27:
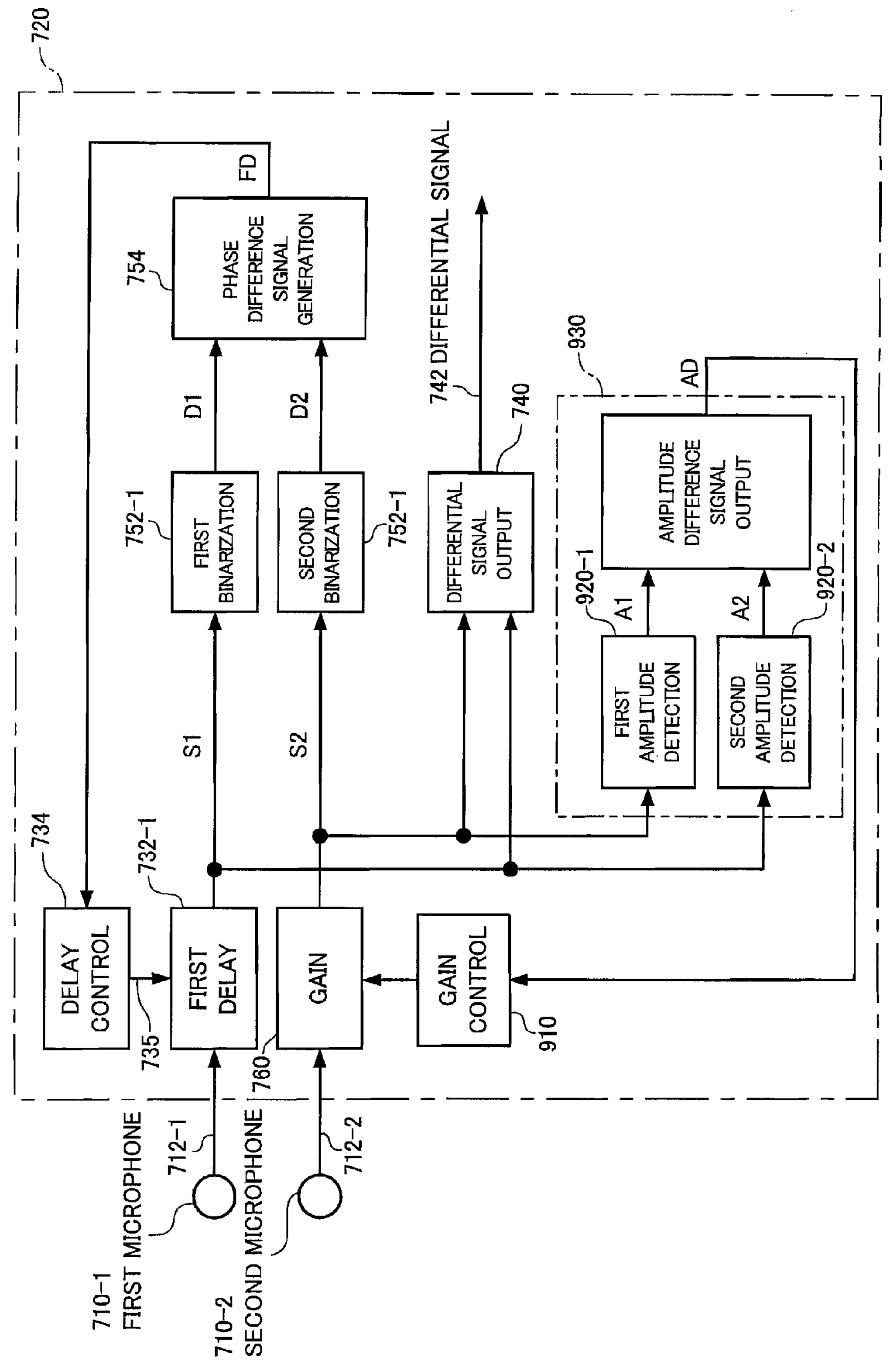
FIG. 27 illustrates an example of the configuration of a voice input device that includes a gain adjustment means.

FIG. 27 illustrates an example of the configuration of a voice input device that includes a gain adjustment means.

The differential signal generation section 720 of the voice input device according to this embodiment includes a gain control section 910. The gain control section 910 changes the amplification factor (gain) of the gain section 760. The balance between the amplitude of the first voltage signal 712-1 obtained by the first microphone 710-1 and the amplitude of the second voltage signal 712-2 obtained by the second microphone 710-2 may be adjusted by causing the gain control section 910 to dynamically control the amplification factor of the gain section 760 based on an amplitude difference signal AD output from an amplitude difference detection section.

The differential signal generation section 720 includes a first amplitude detection means 920-1. The first amplitude detection means 920-1 detects the amplitude of the signal S1 output from the first delay section 732-1, and outputs a first amplitude signal A1.

The differential signal generation section 720 includes a second amplitude detection means 920-2. The second amplitude detection means 920-2 detects the amplitude of the signal S2 output from the gain section 760, and outputs a second amplitude signal A2.

The differential signal generation section 720 includes an amplitude difference detection section 930. The amplitude difference detection section 930 receives the first amplitude signal A1 output from the first amplitude detection means 920-1 and the second amplitude signal A2 output from the second amplitude detection means 920-2, calculates the difference in amplitude between the first amplitude signal A1 and the second amplitude signal A2, and outputs the amplitude difference signal AD. The gain of the gain section 760 may be feedback-controlled by controlling the gain of the gain section 760 based on the amplitude difference signal AD.

7. Configuration of Voice Input Device According to Fourth Embodiment

Figure 28:
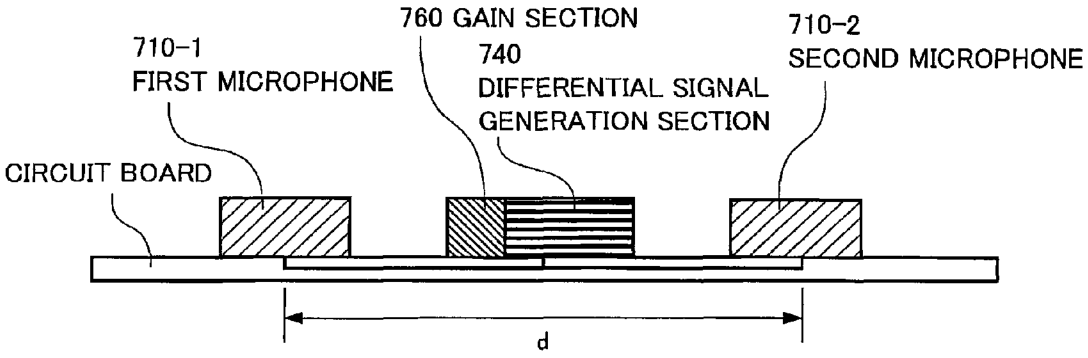
FIG. 28 illustrates an example of the configuration of a voice input device.
Figure 29:
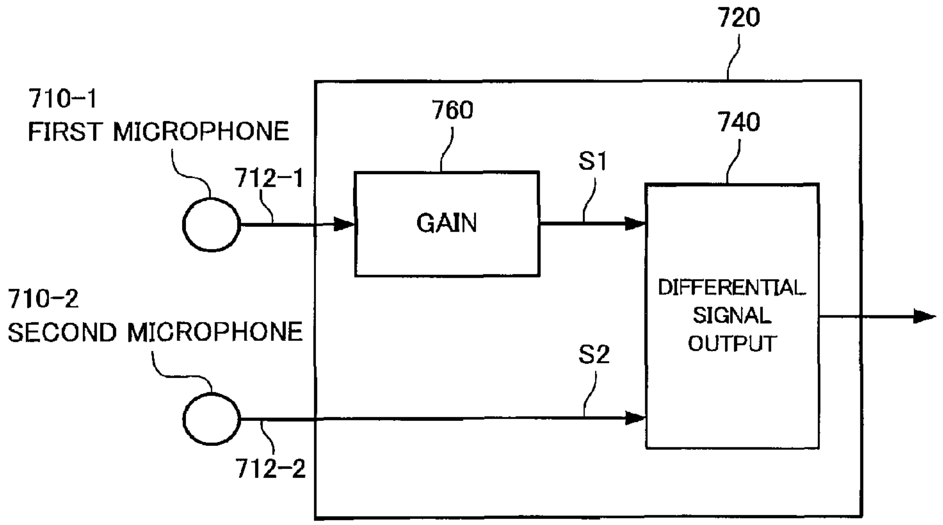
FIG. 29 illustrates an example of the configuration of a voice input device.

FIGS. 28 and 29 respectively illustrate an example of the configuration of a voice input device according to a fourth embodiment.

A voice input device 700 according to the fourth embodiment includes a first microphone 710-1 that includes a first diaphragm. The voice input device 700 according to the fourth embodiment also includes a second microphone 710-2 that includes a second diaphragm.

The first diaphragm of the first microphone 710-1 and the first diaphragm of the second microphone 710-2 are disposed so that a noise intensity ratio that indicates the ratio of the intensity of a noise component contained in a differential signal 742 to the intensity of the noise component contained in a first voltage signal 712-1 or a second voltage signal 712-2 is smaller than an input voice intensity ratio that indicates the ratio of the intensity of an input voice component contained in the differential signal 742 to the intensity of the input voice component contained in the first voltage signal 712-1 or the second voltage signal 712-2.

The first microphone 710-1 that includes the first diaphragm and the second microphone 710-2 that includes the second diaphragm may be configured as described with reference to FIGS. 1 to 8.

The voice input device 700 according to the fourth embodiment includes a differential signal generation section 720 that generates the differential signal 742 that indicates the difference between the first voltage signal 712-1 obtained by the first microphone 710-1 and the second voltage signal 712-2 obtained by the second microphone 710-2 based on the first voltage signal 712-1 and the second voltage signal 712-2.

The differential signal generation section 720 includes a gain section 760. The gain section 760 amplifies the first voltage signal 712-1 obtained by the first microphone 710-1 by a predetermined gain, and outputs the resulting signal.

The differential signal generation section 720 includes a differential signal output section 740. The differential signal output section 740 receives a first voltage signal S1 amplified by the gain section 760 by a predetermined gain and the second voltage signal S2 obtained by the second microphone, generates a differential signal that indicates the difference between the first voltage signal S1 and the second voltage signal, and outputs the differential signal.

Since the first voltage signal and the second voltage signal can be corrected by amplifying (i.e., increasing or decreasing) the first voltage signal 712-1 by a predetermined gain so that the difference in amplitude between the first voltage signal and the second voltage signal is removed, a deterioration in noise reduction effect of the differential microphone due to the difference in sensitivity between the two microphones caused by a production variation or the like can be prevented.

Figure 30:
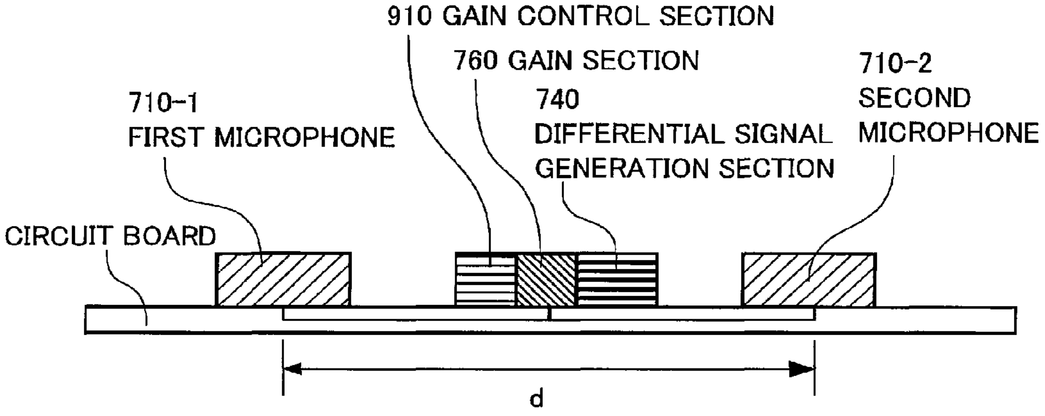
FIG. 30 illustrates an example of the configuration of a voice input device.
Figure 31:
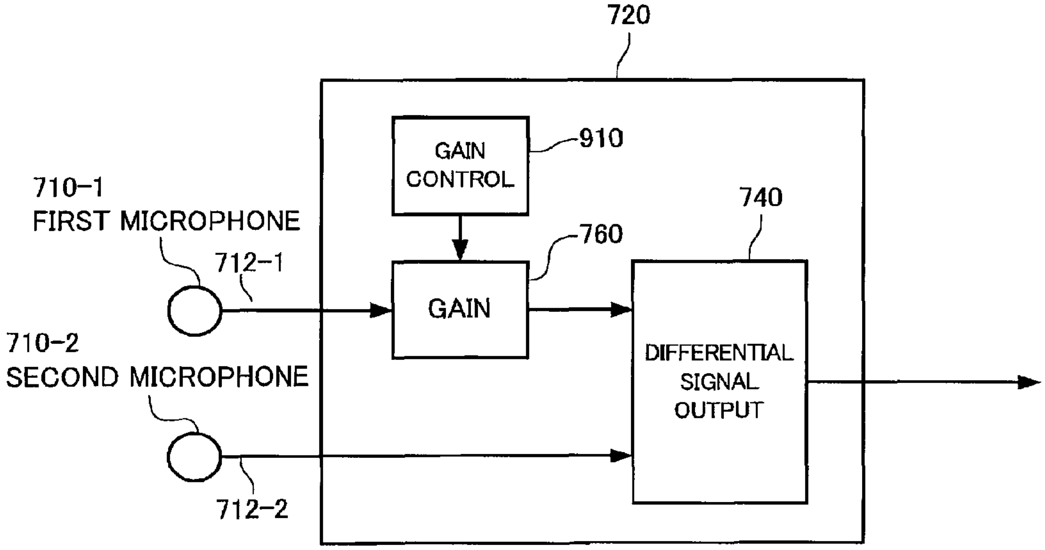
FIG. 31 illustrates an example of the configuration of a voice input device.

FIGS. 30 and 31 respectively illustrate an example of the configuration of the voice input device according to the fourth embodiment.

The differential signal generation section 720 according to this embodiment may include a gain control section 910. The gain control section 910 changes the gain of the gain section 760. The balance between the amplitude of the output S1 from the gain section and the amplitude of the second voltage signal 712-2 obtained by the second microphone may be adjusted by causing the gain control section 910 to dynamically or statically control the gain of the gain section 760.

FIG. 32 illustrates an example of a specific configuration of the gain section and the gain control section. When processing an analog signal, for example, the gain section 760 may be formed by an analog circuit such as an operational amplifier (e.g., a noninverting amplifier circuit in FIG. 32). The amplification factor of the operational amplifier may be controlled by dynamic or statically controlling the voltage applied to the inverting (−) terminal of the operational amplifier by changing the resistances of resistors R1 and R2 or by trimming the resistors R1 and R2 to a predetermined value during production.

Figure 33A:
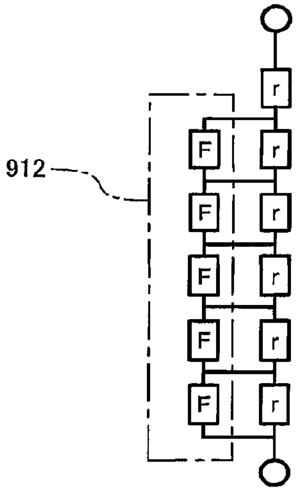
FIG. 33A illustrates an example of a configuration that statically controls the amplification factor of a gain section.
Figure 33B:
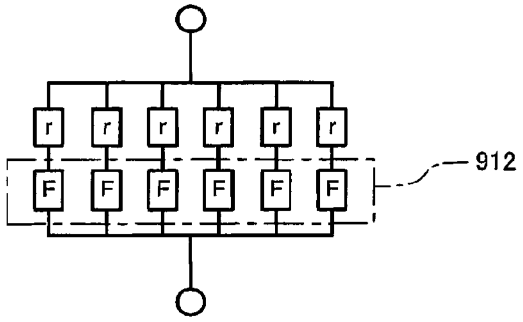
FIG. 33B illustrates an example of a configuration that statically controls the amplification factor of a gain section.

FIGS. 33A and 33B respectively illustrate an example of a configuration that statically controls the amplification factor of the gain section.

As illustrated in FIG. 33A, the resistor R1 or R2 in FIG. 32 may include a resistor array in which a plurality of resistors are connected in series, and a predetermined voltage may be applied to a predetermined terminal (the inverting (−) terminal in FIG. 32) of the gain section through the resistor array, for example. The resistors (r) or conductors (F indicated by 912) that form the resistor array may be cut using a laser or fused by applying a high voltage or a high current during the production process so that the resistor has a resistance that implements an appropriate amplification factor.

As illustrated in FIG. 33B, the resistor R1 or R2 in FIG. 32 may include a resistor array in which a plurality of resistors are connected in parallel, and a predetermined voltage may be applied to a predetermined terminal (the inverting (−) terminal in FIG. 32) of the gain section through the resistor array, for example. The resistors (r) or conductors (F indicated by 912) that form the resistor array may be cut using a laser or fused by applying a high voltage or a high current during the production process so that the resistors have a resistance that implements an appropriate amplification factor.

The amplification factor may be set at a value that cancels the gain balance of the microphone that has occurred during the production process. A resistance corresponding to the gain balance of the microphone that has occurred during the production process can be achieved by utilizing the resistor array in which a plurality of resistors are connected in series or parallel (see FIGS. 33A and 33B), so that the gain control section that is connected to the predetermined terminal controls the gain of the gain section.

This embodiment has been described taking an example in which a plurality of resistors (r) are connected through fuses (F). Note that the invention is not limited thereto. A plurality of resistors (r) may be connected in series or parallel without using the fuses (F). In this case, at least one resistor may be cut.

Alternatively, the resistor R1 or R2 in FIG. 33 may be formed by a single resistor (see FIG. 40), and the resistance of the resistor may be adjusted by cutting part of the resistor (i.e., laser trimming).

Figure 34:
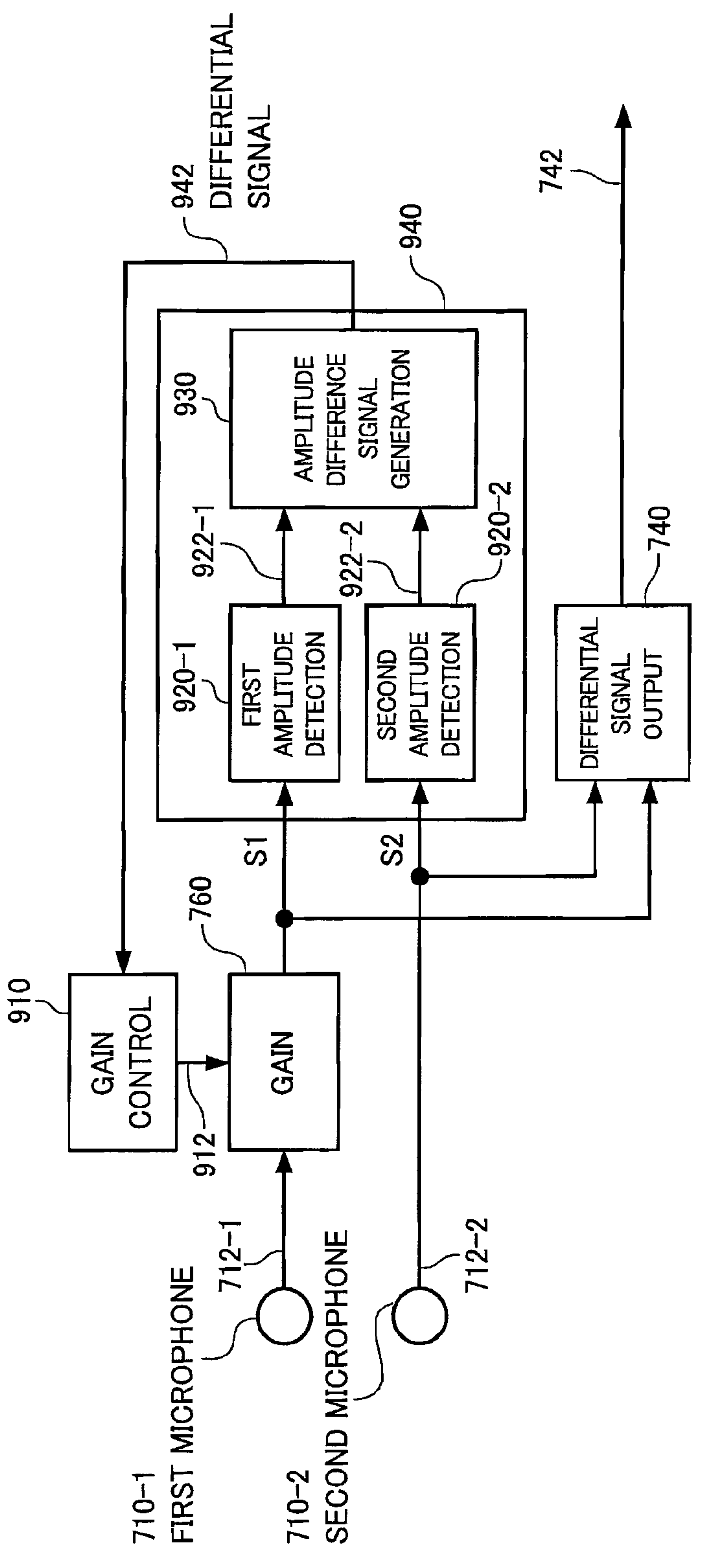
FIG. 34 illustrates an example of the configuration of a voice input device.

FIG. 34 illustrates an example of the configuration of the voice input device according to the fourth embodiment.

The differential signal generation section 720 may include an amplitude difference detection section 940. The amplitude difference detection section 940 receives a first voltage signal (S1) and a second voltage signal (S2) input to the differential signal output section 740, detects the difference in amplitude between the first voltage signal (S1) and the second voltage signal (S2) when the differential signal 742 is generated based on the first voltage signal (S1) and the second voltage signal (S2), generates an amplitude difference signal 942 based on the detection result, and outputs the amplitude difference signal 942.

The gain control section 910 may change the gain of the gain section 760 based on the amplitude difference signal 942.

The amplitude difference detection section 940 may include a first amplitude detection section 920-1 that detects the amplitude of the signal output from the gain section 760, a second amplitude detection section 920-2 that detects the amplitude of the second voltage signal obtained by the second microphone, and an amplitude difference signal generation section 930 that calculates the difference between a first amplitude signal 922-1 output from the first amplitude detection section 920-1 and a second amplitude signal 922-2 output from the second amplitude detection section 920-2, and generates the amplitude difference signal 942.

The first amplitude detection section 920-1 may receive the signal S1 output from the gain section 760, detect the amplitude of the signal S1, and output the first amplitude signal 922-1 based on the detection result. The second amplitude detection section 920-2 may receive the second voltage signal 912-2 obtained by the second microphone, detect the amplitude of the second voltage signal, and output the second amplitude signal 922-2 based on the detection result. The amplitude difference signal generation section 930 may receive the first amplitude signal 922-1 output from the first amplitude detection section 920-1 and the second amplitude signal 922-2 output from the second amplitude detection section 920-2, calculate the difference between the first amplitude signal 922-1 and the second amplitude signal 922-2, and generate and output the amplitude difference signal 942.

The gain control section 910 receives the amplitude difference signal 942 output from the amplitude difference signal output section 930, and outputs the gain control signal (e.g., a predetermined current) 912. The gain of the gain section 760 may be feedback-controlled by controlling the gain of the gain section 760 based on the gain control signal (e.g., a predetermined current) 912.

According to this embodiment, the difference in amplitude that changes during use for various reasons can be detected in real time and adjusted.

The gain control section may adjust the gain so that the difference in amplitude between the signal S1 output from the gain section and the second voltage signal 712-2 (S2) obtained by the second microphone is within a predetermined range with respect to the signal S1 or S2. The amplification factor of the gain section may be adjusted so that a predetermined noise reduction effect (e.g., about 10 or more) is achieved.

For example, the amplification factor of the gain section may be adjusted so that the difference in amplitude between the signals S1 and S2 is within a range from −3% to +3% or a range from −6% to +6% with respect to the signal S1 or S2. When the difference in amplitude between the signals S1 and S2 is within a range from −3% to +3% with respect to the signal S1 or S2, noise can be reduced by about 10 dB. When the difference in amplitude between the signals S1 and S2 is within a range from −6% to +6% with respect to the signal S1 or S2, noise can be reduced by about 6 dB.

Figure 35:
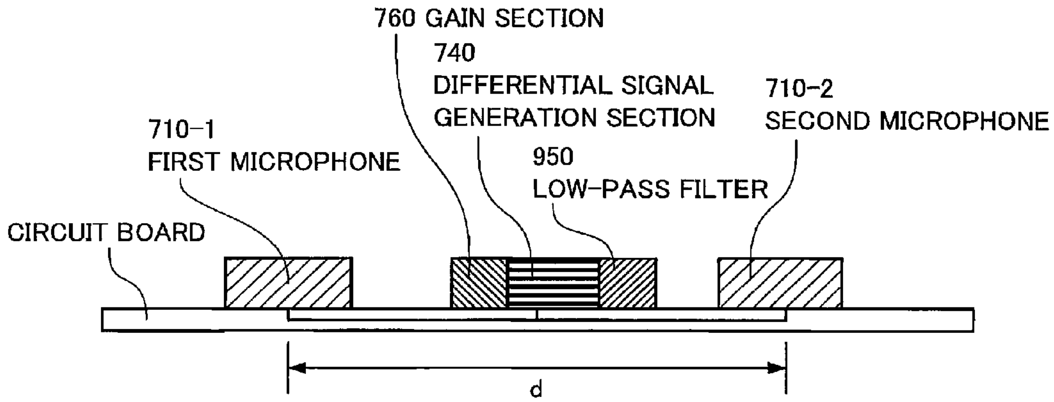
FIG. 35 illustrates an example of the configuration of a voice input device.
Figure 36:
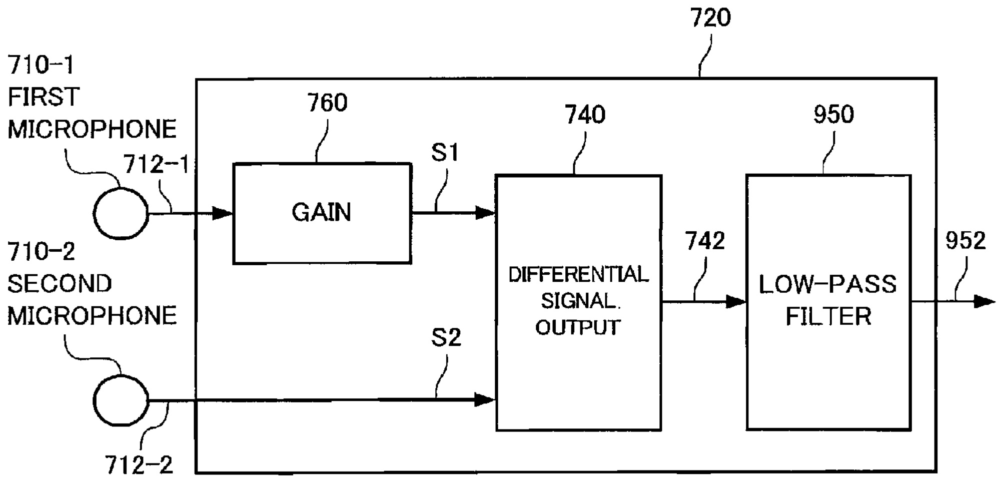
FIG. 36 illustrates an example of the configuration of a voice input device.
Figure 37:
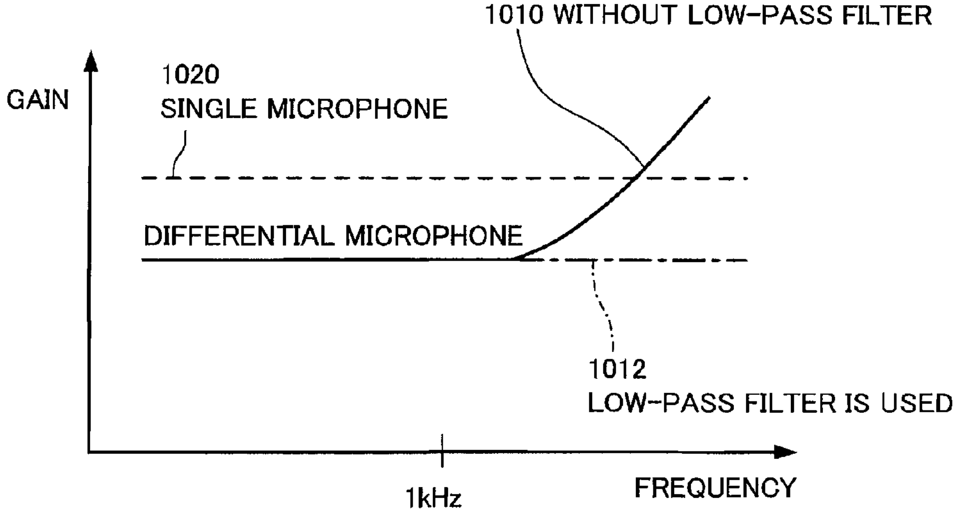
FIG. 37 illustrates an example of the configuration of a voice input device.

FIGS. 35, 36, and 37 respectively illustrate an example of the configuration of the voice input device according to the fourth embodiment.

The differential signal generation section 720 may include a low-pass filter section 950. The low-pass filter section 950 blocks a high-frequency component of the differential signal. A filter having first-order cut-off properties may be used as the low-pass filter section 950. The cut-off frequency of the low-pass filter section 950 may be set at a value K between 1 kHz and 5 kHz. For example, the cut-off frequency of the low-pass filter section 950 is preferably set at about 1.5 to 2 kHz.

The gain section 760 receives the first voltage signal 712-1 obtained by the first microphone 710-1, amplifies the first voltage signal 712-1 by a predetermined amplification factor (gain), and outputs the first voltage signal S1 that has been amplified by a predetermined gain. The differential signal output section 740 receives the first voltage signal S1 amplified by the gain section 760 by a predetermined gain and the second voltage signal S2 obtained by the second microphone 710-2, generates a differential signal 742 that indicates the difference between the first voltage signal S1 and the second voltage signal, and outputs the differential signal 742. The low-pass filter section 950 receives the differential signal 742 output from the differential signal output section 740, and outputs a differential signal 952 obtained by attenuating a high frequency (i.e., a frequency in a band equal to or higher than K) contained in the differential signal 742.

FIG. 37 illustrates the gain characteristics of the differential microphone. The horizontal axis indicates frequency, and the vertical axis indicates gain. Reference numeral 1020 indicates the relationship between the frequency and the gain of the single microphone. The single microphone has flat frequency characteristics. Reference numeral 1010 indicates the relationship between the frequency and the gain of the differential microphone at an assumed speaker position (e.g., frequency characteristics at a position of 50 mm from the center of the first microphone 710-1 and the second microphone 710-2). Even if the first microphone 710-1 and the second microphone 710-2 have flat frequency characteristics, since the high frequency range of the differential signal linearly increases (20 dB/dec) from about 1 kHz, the frequency characteristics of the differential signal can be made flat by attenuating the high frequency range using a first-order low-pass filter having opposite characteristics. Therefore, incorrect audibility can be prevented.

Therefore, almost flat frequency characteristics denoted by 1012 can be obtained by correcting the frequency characteristics of the differential signal using the low-pass filter, as illustrated in FIG. 36. This prevents a situation in which the high frequency range of the speaker's voice or the high frequency range of noise is enhanced to impair the sound quality.

Figure 38:
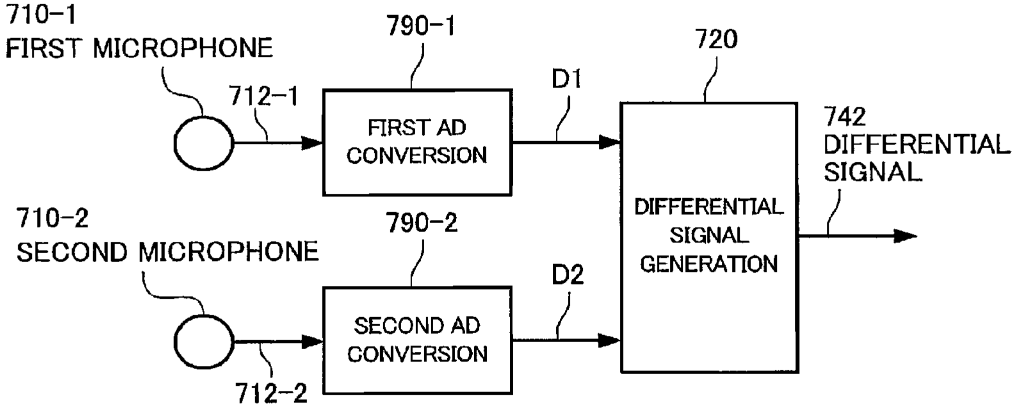
FIG. 38 illustrates an example of the configuration of a voice input device that includes an AD conversion means.

FIG. 38 illustrates an example of the configuration of a voice input device that includes an AD conversion means.

The voice input device according to this embodiment may include a first AD conversion means 790-1. The first AD conversion means 790-1 subjects the first voltage signal 712-1 obtained by the first microphone 710-1 to analog-to-digital conversion.

The voice input device according to this embodiment may include a second AD conversion means 790-2. The second AD conversion means 790-2 subjects the second voltage signal 712-2 obtained by the second microphone 710-2 to analog-to-digital conversion.

The voice input device according to this embodiment includes the differential signal generation section 720. The differential signal generation section 720 may generate the differential signal 742 that indicates the difference between a first voltage signal 782-1 that has been converted into a digital signal by the first AD conversion means 790-1 and a second voltage signal 782-2 that has been converted into a digital signal by the second AD conversion means 790-2, by adjusting the gain balance and the delay balance by digital signal processing calculations based on the first voltage signal 782-1 and the second voltage signal 782-2.

The differential signal generation section 720 may have the configuration described with reference to FIGS. 29, 31, 34, 36, and the like.

8. Configuration of Voice Input Device According to Fifth Embodiment

FIG. 20 illustrates an example of the configuration of a voice input device according to a fifth embodiment.

The voice input device according to this embodiment may include a sound source section 770 provided at an equal distance from a first microphone (first diaphragm 711-1) and a second microphone (second diaphragm 711-2). The sound source section 770 may be formed by an oscillator or the like. The sound source section 770 may be provided at an equal distance from a center point C1 of the first diaphragm 711-1 of the first microphone 710-1 and a center point C2 of the second diaphragm 711-2 of the second microphone 710-2.

The difference in phase or delay between a first voltage signal S1 and a second voltage signal S2 input to a differential signal generation section 740 may be adjusted to zero based on sound output from the sound source section 770.

The amplification factor of a gain section 760 may be changed based on sound output from the sound source section 770.

The difference in amplitude between the first voltage signal S1 and the second voltage signal S2 input to the differential signal generation section 740 may be adjusted to zero based on sound output from the sound source section 770.

A sound source that produces sound having a single frequency may be used as the sound source section 770. For example, the sound source section 770 may produce sound having a frequency of 1 kHz.

The frequency of the sound source section 770 may be set outside the audible band. For example, sound having a frequency (e.g., 30 kHz) higher than 20 kHz is inaudible to human ears. When the frequency of the sound source section 770 is set outside the audible band, the difference in phase, delay, or sensitivity (gain) between the input signals can be adjusted using the sound source section 770 during use without hindering the user.

For example, when forming a delay section 732-1 using an analog filter, the delay amount may change depending on the temperature characteristics. According to this embodiment, it is possible to adjust the delay corresponding to a change in environment (e.g., change in temperature). The delay may be adjusted regularly or intermittently, or may be adjusted when power is supplied.

9. Configuration of Voice Input Device According to Sixth Embodiment

Figure 39:
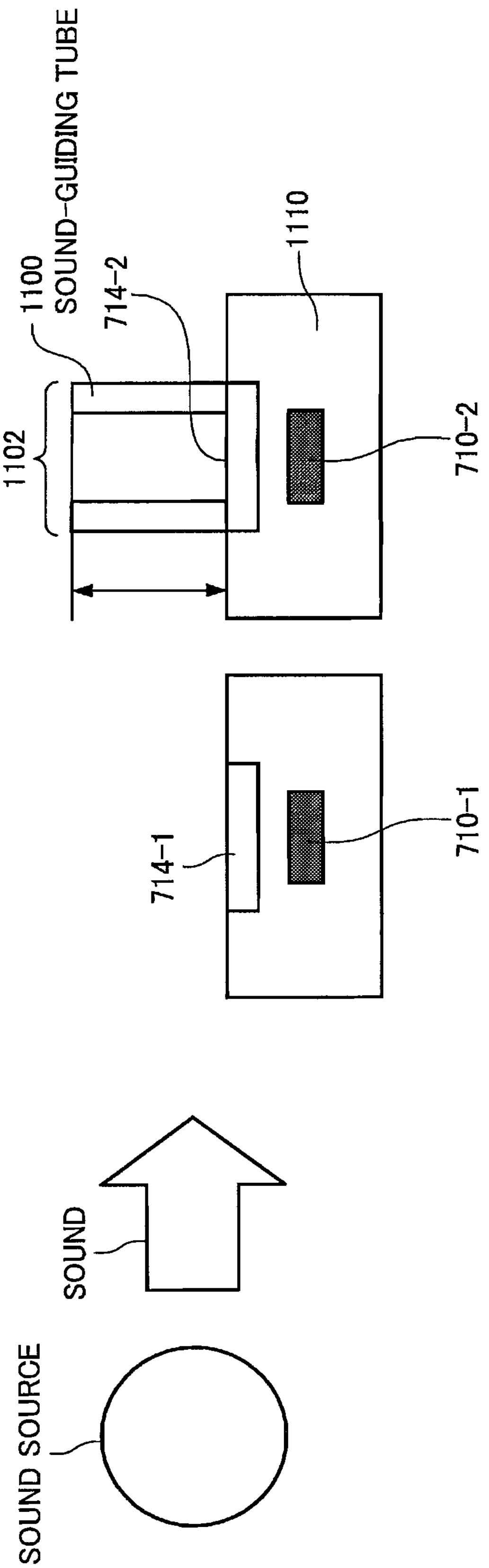
FIG. 39 illustrates an example of the configuration of a voice input device.

FIG. 39 illustrates an example of the configuration of a voice input device according to a sixth embodiment.

The voice input device according to this embodiment includes a first microphone 710-1 that includes a first diaphragm, a second microphone 710-2 that includes a second diaphragm, and a differential signal generation section (not shown) that generates a differential signal that indicates the difference between a first voltage signal obtained by the first microphone and a second voltage signal obtained by the second microphone. At least one of the first diaphragm and the second diaphragm may acquire sound waves through a tubular sound-guiding tube 1100 provided perpendicularly to the surface of the diaphragm.

The sound-guiding tube 1100 may be provided on a substrate 1110 around the diaphragm so that sound waves that have enter an opening 1102 of the tube reach the diaphragm of the second microphone 710-2 through a sound hole 714-2 without leaking to the outside. Therefore, sound that has entered the sound-guiding tube 1100 reaches the diaphragm of the second microphone 710-2 without being attenuated. According to this embodiment, the travel distance of sound before reaching the diaphragm can be changed by providing the sound-guiding tube corresponding to at least one of the first diaphragm and the second diaphragm. Therefore, a delay can be canceled by providing a sound-guiding tube having an appropriate length (e.g., several millimeters) corresponding to a variation in delay balance.

The invention is not limited to the above-described embodiments. Various modifications and variations may be made. The invention includes configurations substantially the same as the configurations described in the above embodiments (e.g., in function, method and effect, or objective and effect). The invention also includes a configuration in which an unsubstantial element of the above embodiments is replaced by another element. The invention also includes a configuration having the same effects as those of the configurations described in the above embodiments, or a configuration capable of achieving the same object as those of the above-described configurations. Further, the invention includes a configuration obtained by adding known technology to the configurations described in the above embodiments.

The invention claimed is:

1. A voice input device comprising:

a first microphone that includes a first diaphragm;

a second microphone that includes a second diaphragm; and a differential signal generation section that generates a differential signal that indicates a difference between a first voltage signal obtained by the first microphone and a second voltage signal obtained by the second microphone based on the first voltage signal and the second voltage signal, the first diaphragm and the second diaphragm being disposed so that a noise intensity ratio that indicates a ratio of intensity of a noise component contained in the differential signal to intensity of the noise component contained in the first voltage signal or the second voltage signal, is smaller than an input voice intensity ratio that indicates a ratio of intensity of an input voice component contained in the differential signal to intensity of the input voice component contained in the first voltage signal or the second voltage signal; and the differential signal generation section including:

a gain section that amplifies the first voltage signal obtained by the first microphone by a predetermined gain; and a differential signal output section that receives the first voltage signal amplified by the gain section and the second voltage signal obtained by the second microphone, generates a differential signal that indicates a difference between the first voltage signal amplified by the gain section and the second voltage signal, and outputs the differential signal, the first diaphragm and the second diaphragm are disposed with a center-to-center distance Δr which is set to a value for which a ratio of the center-to-center distance Δr to a wavelength λ of the main noise corresponds to a noise intensity ratio set for a desired application of the voice input device, and for which the noise intensity ratio is smaller than an input voice intensity ratio, wherein the noise intensity ratio indicates a ratio of intensity of a noise component contained in the differential signal to intensity of the noise component contained in the first voltage signal or the second voltage signal, and the input voice intensity ratio indicates a ratio of intensity of an input voice component contained in the differential signal to intensity of the input voice component contained in the first voltage signal or the second voltage signal.

2. The voice input device as defined in claim 1, wherein the differential signal generation section includes:

the gain section that is configured so that an amplification factor is changed corresponding to a voltage applied to a given terminal or a current that flows through the predetermined terminal; and a gain control section that controls the voltage applied to the predetermined terminal or the current that flows through the predetermined terminal, the gain control section including a resistor array in which a plurality of resistors are connected in series or parallel, or including at least one resistor, and configured so that the voltage applied to the predetermined terminal or the current that flows through the predetermined terminal can be changed by cutting some of the plurality of resistors or conductors that form the resistor array or cutting part of the at least one resistor.

3. The voice input device as defined in claim 1, wherein the differential signal generation section includes:

an amplitude difference detection section that receives the first voltage signal and the second voltage signal input to the differential signal output section, detects a difference in amplitude between the first voltage signal and the second voltage signal when the differential signal is generated based on the first voltage signal and the second voltage signal that have been received, generates an amplitude difference signal based on the detection result, and outputs the amplitude difference signal; and a gain control section that changes an amplification factor of the gain section based on the amplitude difference signal.

4. The voice input device as defined in claim 2, wherein the gain control section controls the amplification factor of the gain section so that a difference in amplitude between a signal output from the gain section and the second voltage signal obtained by the second microphone is within a predetermined range with respect to the signal output from the gain section or the second voltage signal obtained by the second microphone, or a noise reduction effect by predetermined decibels is achieved.

5. The voice input device as defined in claim 3, further comprising:

a sound source section that is provided at an equal distance from the first microphone and the second microphone, wherein the differential signal generation section changes the amplification factor of the gain section based on sound output from the sound source section.

6. A voice input device comprising:

a first microphone that includes a first diaphragm;

a second microphone that includes a second diaphragm;

a differential signal generation section that generates a differential signal that indicates a difference between a first voltage signal obtained by the first microphone and a second voltage signal obtained by the second microphone based on the first voltage signal and the second voltage signal; and a sound source section that is provided at an equal distance from the first microphone and the second microphone, the differential signal generation section including:

a gain section that amplifies the first voltage signal obtained by the first microphone by a predetermined gain to remove the difference in amplitude between the first voltage signal and the second voltage signal;

an amplitude difference detection section that receives the first voltage signal and the second voltage signal input to the differential signal generation section, detects a difference in amplitude between the first voltage signal and the second voltage signal when the differential signal is generated based on the first voltage signal and the second voltage signal that have been received, generates an amplitude difference signal based on the detection result, and outputs the amplitude difference signal; and a gain control section that changes an amplification factor of the gain section based on the amplitude difference signal; and the amplification factor of the gain section being adjusted based on sound output from the sound source section so that an amplitude of the first voltage signal is equal to an amplitude of the second voltage signal.

7. The voice input device as defined in claim 5, wherein the sound source section is a sound source that produces sound having a single frequency.

8. The voice input device as defined in claim 5, wherein a frequency of the sound source section is set outside an audible band.

9. The voice input device as defined in claim 7, wherein the amplitude difference detection section includes band-pass filters that respectively allow the first voltage signal and the second voltage signal input to the differential signal output section to pass through in a band around the single frequency, the amplitude difference detection section detecting a difference in amplitude between the first voltage signal and the second voltage signal that have passed through the band-pass filters, and generating the amplitude difference signal based on the detection result.

10. The voice input device as defined in claim 1, wherein the differential signal generation section includes a low-pass filter section that blocks a high-frequency component of the differential signal.

11. The voice input device as defined in claim 10, wherein the low-pass filter section is a filter having first-order cut-off properties.

12. The voice input device as defined in claim 10, wherein the low-pass filter section has a cut-off frequency in a range from 1 kHz to 5 kHz.

13. The voice input device as defined in claim 1, further comprising:

first AD conversion means that subjects the first voltage signal to analog-to-digital conversion; and second AD conversion means that subjects the second voltage signal to analog-to-digital conversion, wherein the differential signal generation section generates a differential signal that indicates a difference between the first voltage signal that has been converted into a digital signal by the first AD conversion means and the second voltage signal that has been converted into a digital signal by the second AD conversion means based on the first voltage signal and the second voltage signal.

14. A voice input device comprising:

a first microphone that includes a first diaphragm;

a second microphone that includes a second diaphragm; and a differential signal generation section that generates a differential signal that indicates a difference between a first voltage signal obtained by the first microphone and a second voltage signal obtained by the second microphone, the first diaphragm and the second diaphragm being disposed so that a noise intensity ratio that indicates a ratio of intensity of a noise component contained in the differential signal to intensity of the noise component contained in the first voltage signal or the second voltage signal is smaller than an input voice intensity ratio that indicates a ratio of intensity of an input voice component contained in the differential signal to intensity of the input voice component contained in the first voltage signal or the second voltage signal, the first diaphragm and the second diaphragm are disposed with a center-to-center distance $\Delta r$ which is set to a value for which a ratio of the center-to-center distance $\Delta r$ to a wavelength $\lambda$ of the main noise corresponds to a noise intensity ratio set for a desired application of the voice input device, and for which the noise intensity ratio is smaller than an input voice intensity ratio, wherein the noise intensity ratio indicates a ratio of intensity of a noise component contained in the differential signal to intensity of the noise component contained in the first voltage signal or the second voltage signal, and the input voice intensity ratio indicates a ratio of intensity of an input voice component contained in the differential signal to intensity of the input voice component contained in the first voltage signal or the second voltage signal.

15. The voice input device as defined in claim 1, further comprising:

a base, a depression being formed in a main surface of the base, wherein the first diaphragm is disposed on a bottom surface of the depression; and wherein the second diaphragm is disposed on the main surface.

16. The voice input device as defined in claim 15, wherein the base is provided so that an opening that communicates with the depression is disposed closer to an input voice model sound source than a formation area of the second diaphragm on the main surface.

17. The voice input device as defined in claim 1, wherein the depression is shallower than a distance between the opening and the formation area of the second diaphragm.

18. The voice input device as defined in claim 1, further comprising:

a base, a first depression and a second depression that is shallower than the first depression being formed in a main surface of the base, wherein the first diaphragm is disposed on a bottom surface of the first depression; and wherein the second diaphragm is disposed on a bottom surface of the second depression.

19. The voice input device as defined in claim 18, wherein the base is provided so that a first opening that communicates with the first depression is disposed closer to an input voice model sound source than a second opening that communicates with the second depression.

20. The voice input device as defined in claim 18, wherein a difference in depth between the first depression and the second depression is smaller than a distance between the first opening and the second opening.

21. The voice input device as defined in claim 15, wherein the base is provided so that an input voice reaches the first diaphragm and the second diaphragm at the same time.

22. The voice input device as defined in claim 15, wherein the first diaphragm and the second diaphragm are disposed so that a normal to the first diaphragm is parallel to a normal to the second diaphragm.

23. The voice input device as defined in claim 15, wherein the first diaphragm and the second diaphragm are disposed so that the first diaphragm and the second diaphragm do not overlap in a direction perpendicular to a normal direction.

24. The voice input device as defined in claim 15, wherein the first microphone and the second microphone are formed as a semiconductor device.

25. The voice input device as defined in claim 15, wherein a center-to-center distance between the first diaphragm and the second diaphragm is 5.2 mm or less.

26. An information processing system comprising:

the voice input device as defined in claim 1; and an analysis section that analyzes voice information input to the voice input device based on the differential signal.

27. An information processing system comprising:

the voice input device as defined in claim 1; and a host computer that analyzes voice information input to the voice input device based on the differential signal, the voice input device communicating with the host computer through a network via a communication section.

* * * * *